US008645279B2

(12) United States Patent
Schmelzer

(10) Patent No.: US 8,645,279 B2
(45) Date of Patent: *Feb. 4, 2014

(54) COPYRIGHT DETECTION AND PROTECTION SYSTEM AND METHOD

(75) Inventor: Richard A. Schmelzer, Boulder, CO (US)

(73) Assignee: Audible Magic Corporation, Los Gatos, CA (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/488,504

(22) Filed: Jun. 19, 2009

(65) Prior Publication Data

US 2009/0328236 A1    Dec. 31, 2009

Related U.S. Application Data

(60) Continuation of application No. 11/048,307, filed on Jan. 31, 2005, now Pat. No. 7,565,327, which is a division of application No. 10/116,710, filed on Apr. 3, 2002, now Pat. No. 7,363,278.

(60) Provisional application No. 60/281,881, filed on Apr. 5, 2001.

(51) Int. Cl.
*G06Q 40/00*    (2012.01)

(52) U.S. Cl.
USPC ............ 705/67; 382/190; 705/51; 705/55; 705/310; 709/217; 726/26

(58) Field of Classification Search
USPC ............ 705/51, 54; 713/176; 704/E19.009; 382/190, 232, 306
See application file for complete search history.

(56) References Cited

U.S. PATENT DOCUMENTS

| 3,919,479 A | 11/1975 | Moon et al. |
| 4,230,990 A | 10/1980 | Lert, Jr. et al. |
| 4,449,249 A | 5/1984 | Price |
| 4,450,531 A | 5/1984 | Kenyon |
| 4,454,594 A | 6/1984 | Hefron et al. |
| 4,623,837 A | 11/1986 | Efron et al. |
| 4,677,455 A | 6/1987 | Okajima |
| 4,677,466 A | 6/1987 | Lert, Jr. et al. |

(Continued)

FOREIGN PATENT DOCUMENTS

| EP | 0349106 A1 | 1/1990 |
| EP | 0402210 A1 | 6/1990 |

(Continued)

OTHER PUBLICATIONS

Lin, et al., "Generating Robust Digital Signature for Image/Video Authentication," Proc. Multimeida and Security workshop at ACM Multimedia'98, Sep. 1, 1998, pp. 49-54.*

(Continued)

*Primary Examiner* — Robert Niquette
(74) *Attorney, Agent, or Firm* — Lowenstein Sandler LLP

(57) ABSTRACT

A method for detecting against unauthorized transmission of digital works comprises the steps of maintaining a registry of information permitting identification of digital copyrighted works, monitoring a network for transmission of at least one packet-based digital signal, extracting at least one feature from the at least one digital signal, comparing the extracted at least one feature with registry information and applying business rules based on the comparison result.

20 Claims, 22 Drawing Sheets

(56) References Cited

U.S. PATENT DOCUMENTS

| | | | |
|---|---|---|---|
| 4,739,398 A | 4/1988 | Thomas et al. | |
| 4,843,562 A | 6/1989 | Kenyon et al. | |
| 4,918,730 A | 4/1990 | Schulze | |
| 5,210,820 A | 5/1993 | Kenyon | |
| 5,247,688 A | 9/1993 | Ishigami | |
| 5,283,819 A | 2/1994 | Glick | |
| 5,327,521 A | 7/1994 | Savic et al. | |
| 5,437,050 A | 7/1995 | Lamb et al. | |
| 5,442,645 A | 8/1995 | Ugon | |
| 5,504,518 A | 4/1996 | Ellis | |
| 5,581,658 A | 12/1996 | O'Hagan et al. | |
| 5,588,119 A | 12/1996 | Vincent | |
| 5,612,729 A | 3/1997 | Ellis et al. | |
| 5,612,974 A | 3/1997 | Astrachan | |
| 5,613,004 A | 3/1997 | Cooperman et al. | |
| 5,638,443 A | 6/1997 | Stefik | |
| 5,692,213 A | 11/1997 | Goldberg et al. | |
| 5,701,452 A | 12/1997 | Siefert | |
| 5,710,916 A | 1/1998 | Barbara et al. | |
| 5,724,605 A | 3/1998 | Wissner | |
| 5,732,193 A | 3/1998 | Aberson | |
| 5,758,257 A | 5/1998 | Herz et al. | |
| 5,850,388 A | 12/1998 | Anderson | |
| 5,862,260 A | 1/1999 | Rhoads | |
| 5,881,182 A | 3/1999 | Fiete et al. | |
| 5,918,223 A | 6/1999 | Blum et al. | |
| 5,924,071 A | 7/1999 | Morgan et al. | |
| 5,930,369 A | 7/1999 | Cox et al. | |
| 5,943,422 A | 8/1999 | Van Wie et al. | |
| 5,949,885 A | 9/1999 | Leighton | |
| 5,959,659 A | 9/1999 | Dokic | |
| 5,983,176 A | 11/1999 | Hoffert et al. | |
| 6,006,183 A | 12/1999 | Lai et al. | |
| 6,006,256 A | 12/1999 | Zdepski et al. | |
| 6,011,758 A | 1/2000 | Dockes | |
| 6,012,051 A | 1/2000 | Sammons | |
| 6,026,411 A | 2/2000 | Delp | |
| 6,026,439 A | 2/2000 | Chowdhury | |
| 6,044,402 A | 3/2000 | Jacobson | |
| 6,067,369 A | 5/2000 | Kamei | |
| 6,088,455 A | 7/2000 | Logan et al. | |
| 6,092,040 A | 7/2000 | Voran | |
| 6,096,961 A | 8/2000 | Bruti | |
| 6,118,450 A | 9/2000 | Proehl et al. | |
| 6,192,340 B1 | 2/2001 | Abecassis | |
| 6,195,693 B1 | 2/2001 | Berry | |
| 6,229,922 B1 | 5/2001 | Sasakawa et al. | |
| 6,243,615 B1 | 6/2001 | Neway | |
| 6,243,725 B1 | 6/2001 | Hempleman et al. | |
| 6,253,193 B1 | 6/2001 | Ginter | |
| 6,253,337 B1 | 6/2001 | Maloney et al. | |
| 6,279,010 B1 | 8/2001 | Anderson | |
| 6,279,124 B1 | 8/2001 | Brouwer et al. | |
| 6,285,596 B1 | 9/2001 | Miura et al. | |
| 6,330,593 B1 | 12/2001 | Roberts et al. | |
| 6,345,256 B1 | 2/2002 | Milsted et al. | |
| 6,345,274 B1 | 2/2002 | Zhu | |
| 6,360,265 B1 | 3/2002 | Falck et al. | |
| 6,363,381 B1 | 3/2002 | Lee et al. | |
| 6,370,513 B1 | 4/2002 | Kolawa | |
| 6,374,260 B1 | 4/2002 | Hoffert et al. | |
| 6,385,596 B1 | 5/2002 | Wiser | |
| 6,418,421 B1 | 7/2002 | Hurtado et al. | |
| 6,422,061 B1 | 7/2002 | Sunshine | |
| 6,425,081 B1 | 7/2002 | Iwamura | |
| 6,438,556 B1 | 8/2002 | Malik et al. | |
| 6,449,226 B1 | 9/2002 | Kumagai | |
| 6,452,874 B1 | 9/2002 | Otsuka et al. | |
| 6,453,252 B1 | 9/2002 | Laroche | |
| 6,460,050 B1 | 10/2002 | Pace et al. | |
| 6,463,508 B1 | 10/2002 | Wolf et al. | |
| 6,477,704 B1 | 11/2002 | Cremia | |
| 6,487,641 B1 | 11/2002 | Cusson et al. | |
| 6,490,279 B1 | 12/2002 | Chen et al. | |
| 6,496,802 B1 | 12/2002 | van Zoest et al. | |
| 6,526,411 B1 | 2/2003 | Ward | |
| 6,542,869 B1 | 4/2003 | Foote | |
| 6,550,001 B1 | 4/2003 | Corwin et al. | |
| 6,550,011 B1 | 4/2003 | Sims | |
| 6,552,254 B2 | 4/2003 | Hasegawa et al. | |
| 6,591,245 B1 | 7/2003 | Klug | |
| 6,609,093 B1 | 8/2003 | Gopinath et al. | |
| 6,609,105 B2 | 8/2003 | van Zoest et al. | |
| 6,628,737 B1 | 9/2003 | Timus | |
| 6,636,965 B1 | 10/2003 | Beyda | |
| 6,654,757 B1 | 11/2003 | Stern | |
| 6,675,174 B1 | 1/2004 | Bolle et al. | |
| 6,714,921 B2 * | 3/2004 | Stefik et al. | 705/55 |
| 6,732,180 B1 | 5/2004 | Hale | |
| 6,771,316 B1 | 8/2004 | Iggulden | |
| 6,771,885 B1 | 8/2004 | Agnihotri et al. | |
| 6,788,800 B1 | 9/2004 | Carr et al. | |
| 6,834,308 B1 | 12/2004 | Ikezoye | |
| 6,947,909 B1 | 9/2005 | Hoke, Jr. | |
| 6,968,337 B2 | 11/2005 | Wold | |
| 6,990,453 B2 | 1/2006 | Wang et al. | |
| 7,043,536 B1 | 5/2006 | Philyaw | |
| 7,047,241 B1 | 5/2006 | Erickson et al. | |
| 7,058,223 B2 | 6/2006 | Cox | |
| 7,181,398 B2 | 2/2007 | Thong et al. | |
| 7,266,645 B2 | 9/2007 | Garg et al. | |
| 7,269,556 B2 | 9/2007 | Kiss et al. | |
| 7,281,272 B1 | 10/2007 | Rubin et al. | |
| 7,289,643 B2 | 10/2007 | Brunk et al. | |
| 7,349,552 B2 | 3/2008 | Levy et al. | |
| 7,363,278 B2 | 4/2008 | Schmelzer et al. | |
| 7,426,750 B2 * | 9/2008 | Cooper et al. | 726/26 |
| 7,443,797 B2 | 10/2008 | Cheung et al. | |
| 7,474,759 B2 | 1/2009 | Sternberg et al. | |
| 7,500,007 B2 | 3/2009 | Ikezoye et al. | |
| 7,529,659 B2 | 5/2009 | Wold | |
| 7,546,120 B1 | 6/2009 | Ulvenes et al. | |
| 7,562,012 B1 | 7/2009 | Wold | |
| 7,565,327 B2 | 7/2009 | Schmelzer | |
| 7,593,576 B2 * | 9/2009 | Meyer et al. | 382/190 |
| 7,653,210 B2 | 1/2010 | Rhoads | |
| 7,701,941 B2 | 4/2010 | O'Callaghan et al. | |
| 7,707,088 B2 | 4/2010 | Schmelzer et al. | |
| 7,711,652 B2 | 5/2010 | Schmelzer et al. | |
| 7,770,013 B2 | 8/2010 | Rhoads et al. | |
| 7,797,249 B2 | 9/2010 | Schmelzer et al. | |
| 7,877,438 B2 | 1/2011 | Schrempp et al. | |
| 7,917,645 B2 | 3/2011 | Ikezoye et al. | |
| 8,006,314 B2 | 8/2011 | Wold | |
| 8,082,150 B2 | 12/2011 | Wold | |
| 8,086,445 B2 | 12/2011 | Wold | |
| 8,112,818 B2 | 2/2012 | Wold | |
| 8,130,746 B2 | 3/2012 | Schrempp et al. | |
| 8,199,651 B1 | 6/2012 | Schrempp et al. | |
| 8,316,238 B2 | 11/2012 | Mergen et al. | |
| 8,332,326 B2 | 12/2012 | Schrempp et al. | |
| 2001/0013061 A1 | 8/2001 | DeMartin | |
| 2001/0027493 A1 | 10/2001 | Wallace | |
| 2001/0027522 A1 | 10/2001 | Saito | |
| 2001/0034219 A1 | 10/2001 | Hewitt et al. | |
| 2001/0037304 A1 | 11/2001 | Paiz | |
| 2001/0041989 A1 * | 11/2001 | Vilcauskas et al. | 705/1 |
| 2001/0051996 A1 * | 12/2001 | Cooper et al. | 709/217 |
| 2001/0056430 A1 | 12/2001 | Yankowki | |
| 2002/0019858 A1 | 2/2002 | Kaiser | |
| 2002/0023220 A1 | 2/2002 | Kaplan | |
| 2002/0049760 A1 | 4/2002 | Scott | |
| 2002/0064149 A1 | 5/2002 | Elliott et al. | |
| 2002/0069098 A1 | 6/2002 | Schmidt | |
| 2002/0073316 A1 | 6/2002 | Collins | |
| 2002/0082999 A1 | 6/2002 | Lee | |
| 2002/0083060 A1 | 6/2002 | Wang et al. | |
| 2002/0087885 A1 | 7/2002 | Peled et al. | |
| 2002/0120577 A1 | 8/2002 | Hans et al. | |
| 2002/0123990 A1 | 9/2002 | Abe et al. | |
| 2002/0129140 A1 | 9/2002 | Peled et al. | |
| 2002/0133494 A1 | 9/2002 | Goedken | |
| 2002/0133499 A1 | 9/2002 | Ward et al. | |
| 2002/0141384 A1 | 10/2002 | Liu et al. | |

(56) References Cited

U.S. PATENT DOCUMENTS

| | | |
|---|---|---|
| 2002/0152261 A1 | 10/2002 | Arkin et al. |
| 2002/0152262 A1 | 10/2002 | Arkin et al. |
| 2002/0156737 A1 | 10/2002 | Kahn |
| 2002/0157005 A1 | 10/2002 | Brunk et al. |
| 2002/0158737 A1 | 10/2002 | Yokoyama |
| 2002/0186887 A1 | 12/2002 | Rhoads |
| 2002/0198789 A1 | 12/2002 | Waldman |
| 2003/0014530 A1 | 1/2003 | Bodin |
| 2003/0018709 A1 | 1/2003 | Schrempp et al. |
| 2003/0023852 A1 | 1/2003 | Wold |
| 2003/0033321 A1 | 2/2003 | Schrempp et al. |
| 2003/0037010 A1 | 2/2003 | Schmelzer et al. |
| 2003/0051100 A1 | 3/2003 | Patel |
| 2003/0061352 A1 | 3/2003 | Bohrer |
| 2003/0061490 A1 | 3/2003 | Abajian |
| 2003/0095660 A1 | 5/2003 | Lee et al. |
| 2003/0105739 A1 | 6/2003 | Essafi et al. |
| 2003/0135623 A1 | 7/2003 | Schrempp et al. |
| 2003/0191719 A1 | 10/2003 | Ginter et al. |
| 2003/0191764 A1 | 10/2003 | Richards |
| 2003/0195852 A1 | 10/2003 | Campbell et al. |
| 2004/0008864 A1 | 1/2004 | Watson et al. |
| 2004/0010495 A1 | 1/2004 | Kramer et al. |
| 2004/0028281 A1 | 2/2004 | Cheng et al. |
| 2004/0053654 A1 | 3/2004 | Kokumai et al. |
| 2004/0073513 A1 | 4/2004 | Stefik et al. |
| 2004/0089142 A1 | 5/2004 | Georges et al. |
| 2004/0133797 A1 | 7/2004 | Arnold |
| 2004/0148191 A1 | 7/2004 | Hoke |
| 2004/0163106 A1 | 8/2004 | Schrempp et al. |
| 2004/0167858 A1 | 8/2004 | Erickson |
| 2004/0201784 A9 | 10/2004 | Dagtas et al. |
| 2005/0021783 A1 | 1/2005 | Ishii |
| 2005/0038819 A1 | 2/2005 | Hicken et al. |
| 2005/0039000 A1 | 2/2005 | Erickson |
| 2005/0044189 A1 | 2/2005 | Ikezoye et al. |
| 2005/0097059 A1 | 5/2005 | Shuster |
| 2005/0154678 A1 | 7/2005 | Schmelzer |
| 2005/0154680 A1 | 7/2005 | Schmelzer |
| 2005/0154681 A1 | 7/2005 | Schmelzer |
| 2005/0216433 A1 | 9/2005 | Bland et al. |
| 2005/0267945 A1 | 12/2005 | Cohen et al. |
| 2005/0289065 A1* | 12/2005 | Weare ........................ 705/51 |
| 2006/0034177 A1 | 2/2006 | Schrempp |
| 2006/0062426 A1 | 3/2006 | Levy et al. |
| 2007/0033409 A1 | 2/2007 | Brunk et al. |
| 2007/0074147 A1 | 3/2007 | Wold |
| 2007/0078769 A1 | 4/2007 | Way et al. |
| 2007/0186229 A1 | 8/2007 | Conklin et al. |
| 2007/0226365 A1 | 9/2007 | Hildreth et al. |
| 2008/0008173 A1 | 1/2008 | Kanevsky et al. |
| 2008/0019371 A1 | 1/2008 | Anschutz et al. |
| 2008/0133415 A1 | 6/2008 | Ginter et al. |
| 2008/0141379 A1 | 6/2008 | Schmelzer |
| 2008/0154730 A1 | 6/2008 | Schmelzer |
| 2008/0155116 A1 | 6/2008 | Schmelzer |
| 2009/0030651 A1 | 1/2009 | Wold |
| 2009/0031326 A1 | 1/2009 | Wold |
| 2009/0043870 A1 | 2/2009 | Ikezoye et al. |
| 2009/0077673 A1 | 3/2009 | Schmelzer |
| 2009/0089586 A1 | 4/2009 | Brunk |
| 2009/0131152 A1 | 5/2009 | Busse |
| 2009/0192640 A1 | 7/2009 | Wold |
| 2009/0240361 A1 | 9/2009 | Wold et al. |
| 2011/0119149 A1 | 5/2011 | Ikezoye et al. |
| 2012/0124679 A1 | 5/2012 | Wold |
| 2013/0011008 A1 | 1/2013 | Ikezoye et al. |

FOREIGN PATENT DOCUMENTS

| | | |
|---|---|---|
| EP | 0517405 A2 | 5/1992 |
| EP | 0689316 A2 | 12/1995 |
| EP | 0731446 | 9/1996 |
| EP | 0859503 | 8/1998 |
| EP | 0459046 | 4/1999 |
| EP | 1354276 B1 | 12/2007 |
| EP | 1485815 B1 | 10/2009 |
| EP | 177191 B1 | 2/2012 |
| EP | 1449103 B1 | 3/2012 |
| GB | 2464049 | 12/2012 |
| WO | WO 96/36163 A3 | 11/1996 |
| WO | WO 98/20672 A3 | 5/1998 |
| WO | WO 00/05650 A1 | 2/2000 |
| WO | WO 00/39954 A1 | 7/2000 |
| WO | WO 00/63800 A1 | 10/2000 |
| WO | WO 01/23981 A1 | 4/2001 |
| WO | WO 01/47179 A1 | 6/2001 |
| WO | WO 01/52540 A1 | 7/2001 |
| WO | WO 01/62004 | 8/2001 |
| WO | WO 02/03203 | 1/2002 |
| WO | WO 02/15035 | 2/2002 |
| WO | WO 02/27600 * 4/2002 .............. G06F 17/60 |
| WO | WO 02/37316 | 5/2002 |
| WO | WO 02/82271 | 10/2002 |
| WO | WO 03/007235 A1 | 1/2003 |
| WO | WO 03/009149 A1 | 1/2003 |
| WO | WO 03/036496 A1 | 5/2003 |
| WO | WO 03/067459 A1 | 8/2003 |
| WO | WO 03/091990 A1 | 11/2003 |
| WO | WO 2004/044820 A1 | 5/2004 |
| WO | WO 2004/070558 | 8/2004 |
| WO | WO 2006/015168 A2 | 2/2006 |
| WO | WO 2009/017710 | 2/2009 |

OTHER PUBLICATIONS

Baum, L., et al., "A Maximization Technique Occurring in the Statistical Analysis of Probabilistic Functions of Markov Chains," *The Annals of Mathematical Statistics*, vol. 41, No. 1, pp. 164-171, 1970.

Beritelli, F., et al., "Multilayer Chaotic Encryption for Secure Communications in packet switching Networks," IEEE, vol. 2, Aug. 2000, pp. 1575-1582.

Blum, T., Keislar, D., Wheaton, J., and Wold, E., "Audio Databases with Content-Based Retrieval," Proceedings of the 1995 International Joint Conference on Artificial Intelligence (IJCAI) Workshop on Intelligent Multimedia Information Retrieval, 1995.

Breslin, Pat, et al., Relatable Website, "Emusic uses Relatable's open source audio recognition solution, TRM, to signature its music catabblog for MusicBrainz database," http://www.relatable.com/news/pressrelease/001017.release.html, Oct. 17, 2000.

Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.

Business Wire, "IBM: IBM Announces New Descrambler Software; First to Offer Software to Work With Digital Video Chips," Jun. 5, 25, 1997, 07:49.

Chen, et al., Yong-Cong, A Secure and Robust Digital Watermaking Technique by the Blcok Cipher RC6 and Secure Hash Algorithm, Deparment of Computer Science, National Tsing Hua University, 2001.

Cosi, P., De Poli, G., Prandoni, P., "Timbre Characterization with Mel-Cepstrum and Neural Nets," Proceedings of the 1994 International Computer Music Conference, pp. 42-45, San Francisco, No date.

Dempster, A.P., et al., "Maximum Likelihood from Incomplete Data via the EM Algorithm" *Journal of the Royal Statistical Society, Series B (Methodological)*, vol. 39, Issue 1, pp. 31-38, 1977.

Feiten, B. and Gunzel, S., "Automatic Indexing of a Sound Database Using Self-Organizing Neural Nets," Computer Music Journal, 18:3, pp. 53-65, Fall 1994.

Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.

Foote, J., "A Similarity Measure for Automatic Audio Classification," Institute of Systems Science, National University of Singapore, 1977, Singapore.

Gasaway Laura, Close of Century Sees New Copyright Amendments, Mar. 2000, Information Outlook, 4, 3, 42.

(56) References Cited

OTHER PUBLICATIONS

Gonzalez, R. and Melih, K., "Content Based Retrieval of Audio," The Institute for Telecommunication Research, University of Wollongong, Australia, No date.
Haitsma, J., et al., "Robust Audio Hashing for Content Identification", CBMI 2001, Second International Workshop on Content Based Multimedia and Indexing, Brescia, Italy, Sep. 19-21, 2001.
Harris, Lesley Ellen, "To register or not," Mar. 2006, Information Outlook, 10, 3, 32(s).
Kanth, K.V. et al. "Dimensionality Reduction or Similarity Searching in Databases," Computer Vision and Image understanding, vol. 75, Nos. 1/2 Jul./Aug. 1999, pp. 59-72, Academic Press. Santa Barbara, CA, USA.
Keislar, D., Blum, T., Wheaton, J., and Wold, E., "Audio Analysis for Content-Based Retrieval" Proceedings of the 1995 International Computer Music Conference.
Ohtsuki, K., et al., "Topic extraction based on continuous speech recognition in broadcast-news speech," Proceedings IEEE Workshop on Automated Speech Recognition and Understanding, 1997, pp. 527-534, N.Y., N.Y., USA.
Packethound Tech Specs, www.palisdesys.com/products/packethount/tck specs/prod Phtechspecs.shtml, 2002.
"How does PacketHound work?", www.palisdesys.com/products/packethound/how_does_it_work/prod_Pghhow.shtml 2002.
Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.
Reynolds, D., et al., "Robust Text-Independent Speaker Identification Using Gaussian Mixture Speaker Models", *IEEE Transactions on Speech and Audio Processing*, vol. 3, No. 1, pp. 72-83 Jan. 1995.
Scheirer, E., Slaney, M., "Construction and Evaluation of a Robust Multifeature Speech/Music Discriminator," pp. 1-4, Proceedings of ICASSP-97, Apr. 2-24, Munich, Germany.
Scheirer, E.D., "Tempo and Beat Analysis of Acoustic Musical Signals," Machine Listening Group, E15-401D MIT Media Laboratory, pp. 1-21, Aug. 8, 1997, Cambridge, MA.
Schneier, Bruce, Applied Cryptography, Protocols, Algorithms and Source Code in C, Chapter 2 Protocol Building Blocks, 1996, pp. 30-31.
Smith, Alan J., "Cache Memories," Computer Surveys, Sep. 1982, University of California, Berkeley, California, vol. 14, No. 3, pp. 1-61.
Vertegaal, R. and Bonis, E., "ISEE: An Intuitive Sound Editing Environment," Computer Music Journal, 18:2, pp. 21-22, Summer 1994.
Wang, Yao, et al., "Multimedia Content Analysis," IEEE Signal Processing Magazine, pp. 12-36, Nov. 2000, IEEE Service Center, Piscataway, N.J., USA.
Wold, Erling, et al., "Content Based Classification, Search and Retrieval of Audio," IEEE Multimedia, vol. 3, No. 3, pp. 27-36, 1996 IEEE Service Center, Piscataway, N.J., USA.
Zawodny, Jeremy, D., "A C Program to Compute CDDB discids on Linus and FreeBSD," [internet] http://jeremy.zawodny.com/c/discid-linux-1.3tar.gz, 1 page, Apr. 14, 2001, retrieved Jul. 17, 2007.
European Patent Application No. 02752347.1, Supplementary European Search Report Dated May 8, 2006, 4 pages.
European Patent Application No. 02756525.8, Supplementary European Search Report Dated Jun. 28, 2006, 4 pages.
European Patent Application No. 02782170, Supplementary European Search Report Dated Feb. 7, 2007, 4 Pages.
European Patent Application No. 02725522.3, Supplementary European Search Report Dated May 12, 2006, 2 Pages.
European Patent Application No. 04706547.9 European Search Report Dated Feb. 25, 2010, 3 Pages.
European Patent Application No. 05778109.8 European Search Report Dated Sep. 10, 2010, 7 Pages.
PCT Search Report PCT/US01/50295, International Search Report dated May 14, 2003, 5 Pages.
PCT Search Report PCT/US02/10615, International Search Report dated Aug. 7, 2002, 2 Pages.
PCT Search Report PCT/US02/33186, International Search Report dated Dec. 16, 2002, pp. 1-4.
PCT Search Report PCT/US04/02748, International Search Report and Written Opinion dated Aug. 20, 2007, 6 Pages.
PCT Search Report PCT/US05/26887, International Search Report dated May 3, 2006, 2 Pages.
PCT Search Report PCT/US08/09127, International Search Report dated Oct. 30, 2008, 8 Pages.
Audible Magic Office Action for U.S. Appl. No. 09/511,632 mailed Dec. 4, 2002.
Audible Magic Office Action for U.S. Appl. No. 09/511,632 mailed May 13, 2003.
Audible Magic Office Action for U.S. Appl. No. 09/511,632 mailed Aug. 27, 2003.
Audible Magic Office Action for U.S. Appl. No. 09/511,632 mailed Feb. 5, 2004.
Audible Magic Notice of Allowance for U.S. Appl. No. 09/511,632 mailed Aug. 10, 2004.
Audible Magic Notice of Allowance for U.S. Appl. No. 10/955,841 mailed Sep. 25, 2006.
Audible Magic Notice of Allowance for U.S. Appl. No. 10/955,841 mailed Mar. 23, 2007.
Audible Magic Notice of Allowance for U.S. Appl. No. 10/955,841 mailed Sep. 11, 2007.
Audible Magic Notice of Allowance for U.S. Appl. No. 10/955,841 mailed Feb. 25, 2008.
Audible Magic Notice of Allowance for U.S. Appl. No. 12/251,404 mailed May 14, 2010.
Audible Magic Office Action for U.S. Appl. No. 08/897,662 mailed Aug. 13, 1998.
Audible Magic Notice of Allowance for U.S. Appl. No. 08/897,662 mailed Jan. 29, 1999.
Audible Magic Office Action for U.S. Appl. No. 09/706,227 mailed May 5, 2004.
Audible Magic Office Action for U.S. Appl. No. 09/706,227 mailed Nov. 12, 2004.
Audible Magic Office Action for U.S. Appl. No. 09/706,227 mailed May 9, 2005.
Audible Magic Office Action for U.S. Appl. No. 09/706,227 mailed Nov. 1, 2005.
Audible Magic Office Action for U.S. Appl. No. 09/706,227 mailed Jun. 23, 2006.
Audible Magic Office Action for U.S. Appl. No. 09/706,227 mailed Nov. 7, 2006.
Audible Magic Office Action for U.S. Appl. No. 09/706,227 mailed Mar. 29, 2007.
Audible Magic Office Action for U.S. Appl. No. 09/706,227 mailed Sep. 17, 2007.
Audible Magic Office Action for U.S. Appl. No. 09/706,227 mailed May 29, 2008.
Audible Magic Office Action for U.S. Appl. No. 09/706,227 mailed Jan. 9, 2009.
Audible Magic Office Action for U.S. Appl. No. 10/192,783 mailed Dec. 13, 2004.
Audible Magic Notice of Allowance for U.S. Appl. No. 10/192,783 mailed Jun. 7, 2005.
Audible Magic Office Action for U.S. Appl. No. 11/239,543 mailed Apr. 23, 2008.
Audible Magic Notice of Allowance for U.S. Appl. No. 11/239,543 mailed Nov. 6, 2008.
Audible Magic Notice of Allowance for U.S. Appl. No. 11/239,543 mailed Jan. 25, 2009.
Audible Magic Office Action for U.S. Appl. No. 12/410,445 mailed Aug. 10, 2010.
Audible Magic Notice of Allowance for U.S. Appl. No. 12/410,445 mailed Oct. 20, 2010.
Audible Magic Office Action for U.S. Appl. No. 09/910,680 mailed Nov. 17, 2004.
Audible Magic Office Action for U.S. Appl. No. 09/910,680 mailed May 16, 2005.
Audible Magic Office Action for U.S. Appl. No. 09/910,680 mailed Sep. 29, 2005.

(56) References Cited

OTHER PUBLICATIONS

Audible Magic Office Action for U.S. Appl. No. 09/910,680 mailed Jun. 23, 2006.
Audible Magic Office Action for U.S. Appl. No. 09/910,680 mailed Aug. 8, 2006.
Audible Magic Office Action for U.S. Appl. No. 09/910,680 mailed Jan. 25, 2007.
Audible Magic Office Action for U.S. Appl. No. 09/910,680 mailed Dec. 5, 2007.
Audible Magic Office Action for U.S. Appl. No. 09/999,763 mailed Apr. 6, 2005.
Audible Magic Office Action for U.S. Appl. No. 09/999,763 mailed Oct. 6, 2005.
Audible Magic Office Action for U.S. Appl. No. 09/999,763 mailed Apr. 7, 2006.
Audible Magic Office Action for U.S. Appl. No. 09/999,763 mailed Oct. 6, 2006.
Audible Magic Office Action for U.S. Appl. No. 09/999,763 mailed Mar. 7, 2007.
Audible Magic Office Action for U.S. Appl. No. 09/999,763 mailed Aug. 20, 2007.
Audible Magic Office Action for U.S. Appl. No. 09/999,763 mailed Jan. 7, 2008.
Audible Magic Office Action for U.S. Appl. No. 09/999,763 mailed Jun. 27, 2008.
Audible Magic Office Action for U.S. Appl. No. 09/999,763 mailed Dec. 22, 2008.
Audible Magic Office Action for U.S. Appl. No. 09/999,763 mailed Jul. 20, 2009.
Audible Magic Office Action for U.S. Appl. No. 09/999,763 mailed Dec. 21, 2009.
Audible Magic Office Action for U.S. Appl. No. 09/999,763 mailed Jun. 23, 2010.
Audible Magic Office Action for U.S. Appl. No. 10/072,238 mailed May 3, 2005.
Audible Magic Office Action for U.S. Appl. No. 10/072,238 mailed Oct. 25, 2005.
Audible Magic Office Action for U.S. Appl. No. 10/072,238 mailed Apr. 25, 2006.
Audible Magic Office Action for U.S. Appl. No. 10/072,238 mailed Sep. 19, 2007.
Audible Magic Office Action for U.S. Appl. No. 10/072,238 mailed Apr. 7, 2008.
Audible Magic Office Action for U.S. Appl. No. 10/072,238 mailed Oct. 1, 2008.
Audible Magic Office Action for U.S. Appl. No. 10/072,238 mailed Jan. 9, 2009.
Audible Magic Office Action for U.S. Appl. No. 10/072,238 mailed Mar. 31, 2009.
Audible Magic Office Action for U.S. Appl. No. 10/072,238 mailed Aug. 6, 2010.
Audible Magic Office Action for U.S. Appl. No. 11/116,710 mailed Dec. 13, 2004.
Audible Magic Office Action for U.S. Appl. No. 11/116,710 mailed Apr. 8, 2005.
Audible Magic Office Action for U.S. Appl. No. 11/116,710 mailed Oct. 7, 2005.
Audible Magic Office Action for U.S. Appl. No. 11/116,710 mailed Apr. 20, 2006.
Audible Magic Office Action for U.S. Appl. No. 11/116,710 mailed Jul. 31, 2006.
Audible Magic Office Action for U.S. Appl. No. 11/116,710 mailed Jan. 16, 2007.
Audible Magic Notice of Allowance for U.S. Appl. No. 11/116,710 mailed Nov. 19, 2007.
Audible Magic Office Action for U.S. Appl. No. 11/048,307 mailed Aug. 22, 2007.
Audible Magic Office Action for U.S. Appl. No. 11/048,307 mailed May 16, 2008.
Audible Magic Notice of Allowance for U.S. Appl. No. 11/048,307 mailed May 29, 2009.
Audible Magic Office Action for U.S. Appl. No. 11/048,308 mailed Feb. 25. 208.
Audible Magic Office Action for U.S. Appl. No. 11/048,308 mailed Mar. 5, 2009.
Audible Magic Notice of Allowance for U.S. Appl. No. 11/048,308 mailed Aug. 7, 2009.
Audible Magic Office Action for U.S. Appl. No. 11/048,338 mailed Apr. 18, 2007.
Audible Magic Office Action for U.S. Appl. No. 11/048,338 mailed Oct. 11, 2007.
Audible Magic Office Action for U.S. Appl. No. 11/048,338 mailed Jan. 14, 2008.
Audible Magic Office Action for U.S. Appl. No. 11/048,338 mailed Jul. 9, 2008.
Audible Magic Office Action for U.S. Appl. No. 11/048,338 mailed Jan. 7, 2009.
Audible Magic Office Action for U.S. Appl. No. 11/048,338 mailed Jul. 6, 2009.
Audible Magic Office Action for U.S. Appl. No. 11/048,338 mailed Dec. 28, 2009.
Audible Magic Office Action for U.S. Appl. No. 11/048,338 mailed Jun. 24, 2010.
Audible Magic Office Action for U.S. Appl. No. 12/035,599 mailed Nov. 17, 2008.
Audible Magic Office Action for U.S. Appl. No. 12/035,599 mailed May 29, 2009.
Audible Magic Office Action for U.S. Appl. No. 12/035,599 mailed Nov. 24, 2009.
Audible Magic Office Action for U.S. Appl. No. 12/035,599 mailed Jun. 9, 2010.
Audible Magic Office Action for U.S. Appl. No. 12/035,609 mailed Dec. 29, 2008.
Audible Magic Office Action for U.S. Appl. No. 12/035,609 mailed Jun. 24, 2009.
Audible Magic Notice of Allowance for U.S. Appl. No. 12/035,609 mailed Dec. 11, 2009.
Audible Magic Notice of Allowance for U.S. Appl. No. 12/277,291 mailed May 12, 2010.
Audible Magic Office Action for U.S. Appl. No. 10/356,318 mailed May 24, 2006.
Audible Magic Office Action for U.S. Appl. No. 10/356,318 mailed Nov. 2, 2006.
Audible Magic Office Action for U.S. Appl. No. 10/356,318 mailed Apr. 11, 2007.
Audible Magic Office Action for U.S. Appl. No. 10/356,318 mailed Nov. 1, 2007.
Audible Magic Office Action for U.S. Appl. No. 10/356,318 mailed May 9, 2008.
Audible Magic Office Action for U.S. Appl. No. 10/356,318 mailed Jan. 6, 2009.
Audible Magic Office Action for U.S. Appl. No. 10/356,318 mailed Jun. 15, 2009.
Audible Magic Office Action for U.S. Appl. No. 10/356,318 mailed Jan. 21, 2010.
Audible Magic Office Action for U.S. Appl. No. 11/191,493 mailed Jul. 17, 2008.
Audible Magic Office Action for U.S. Appl. No. 11/191,493 mailed Jan. 9, 2009.
Audible Magic Office Action for U.S. Appl. No. 11/191,493 mailed Apr. 28, 2009.
Audible Magic Office Action for U.S. Appl. No. 11/191,493 mailed Nov. 19, 2009.
Audible Magic Office Action for U.S. Appl. No. 11/191,493 mailed May 25, 2010.
Audible Magic Office Action for U.S. Appl. No. 11/191,493 mailed Oct. 4, 2010.
Audible Magic Office Action for U.S. Appl. No. 11/829,662 mailed Oct. 8, 2010.
Audible Magic Office Action for U.S. Appl. No. 11/923,491 mailed Nov. 12, 2010.

(56) References Cited

OTHER PUBLICATIONS

Pellom, B. et al., "Fast Likelihood Computation Techniques in Nearest-Neighbor search for Continuous Speech Recognition.", *IEEE Signal Processing Letters*, vol. 8, pp. 221-224 Aug. 2001.

Audible Magic Notice of Allowance for U.S. Appl. No. 09/999,763 mailed Sep. 16, 2010.

Audible Magic Office Action for U.S. Appl. No. 10/356,318 mailed Jan. 7, 2011.

Audible Magic Office ACtion for U.S. Appl. No. 12/042,023 mailed Dec. 29, 2008.

Audible Magic Office Action for U.S. Appl. No. 12/042,023 mailed Jun. 25, 2009.

Audible Magic Notice of Allowance for U.S. Appl. No. 12/042,023 mailed Mar. 8, 2010.

Albert, Douglas, et al., "Combatting Software Piracy by encryption and key management," IEEE Computer Society, vol. 17. No. 4, Apr. 1984, 6 pages.

USPTO Office Action for U.S. Appl. No. 13/011,776 mailed Feb. 26, 2013.

USPTO Office Action for U.S. Appl. No. 13/011,776 mailed Jul. 10, 2013.

USPTO Office Action for U.S. Appl. No. 13/011,776 mailed Feb. 5, 2013.

USPTO Notice of Allowance for U.S. Appl. No. 12/482,313 mailed Aug. 23, 2011.

USPTO Notice of Allowance for U.S. Appl. No. 12/410,445 mailed Aug. 12, 2011.

USPTO Office Action for U.S. Appl. No. 09/910,680 mailed May 21, 2013.

USPTO Office Action for U.S. Appl. No. 12/035,599 mailed Jun. 9, 2010.

USPTO Office Action for U.S. Appl. No. 12/035,599 mailed Aug. 7, 2012.

USPTO Notice of Allowance for U.S. Appl. No. 12/035,599 mailed Mar. 11, 2013.

USPTO Office Action for U.S. Appl. No. 10/356,318 mailed Jun. 17, 2011.

USPTO Notice of Allowance for U.S. Appl. No. 10/356,318 mailed Oct. 16, 2012.

USPTO Notice of Allowance for U.S. Appl. No. 11/191,493 mailed Feb. 17, 2011.

USPTO Notice of Allowance for U.S. Appl. No. 11/829,662 mailed Apr. 11, 2011.

USPTO Notice of Allowance for U.S. Appl. No. 11/923,491 mailed Sep. 29, 2011.

USPTO Office Action for U.S. Appl. No. 13/355,424 mailed Jan. 18, 2013.

USPTO Office Action for U.S. Appl. No. 13/355,424 mailed May 24, 2013.

USPTO Office Action for U.S. Appl. No. 12/405,174 mailed Sep. 9, 2011.

USPTO Notice of Allowance for U.S. Appl. No. 12/405,174 mailed Jan. 4, 2012.

Audible Magic Corporation, "Audio Identification Technology Provides the Cornerstone for Online Distribution," 2000, http://www.audiblemagic.com/documents/Technology_Summary.pdf.

Audible Magic Office Action for U.S. Appl. No. 12/482,313 mailed Feb. 4, 2011.

Audible Magic Office Action for U.S. Appl. No. 12/405,174 mailed Mar. 2, 2011.

* cited by examiner

| SOURCE IP ADDRESS | DESTINATION IP ADDRESS | DATE TRANSMITTED | TIME TRANSMITTED | FILE TYPE |
|---|---|---|---|---|
| SOURCE ADDR. 1 | SOURCE ADDR. 2 | 03/01/01 | 9:12:15 | MPG |
| ⋮ | ⋮ | ⋮ | ⋮ | ⋮ |
| SOURCE ADDR. 99 | SOURCE ADDR. 99 | 03/06/01 | 11:21:45 | .AVI |

| CONTENT/ MEDIA NAME | ARTIST NAME | ALBUM NAME | RECORD LABEL/ STUDIO | META-DATA |
|---|---|---|---|---|
| SONG 1 | ARTIST 1 | ALBUM 1 | LABEL 1 | PRODUCER 1 |
| ⋮ | ⋮ | ⋮ | ⋮ | ⋮ |
| MOVIE 12 | ARTIST 6 | N/A | STUDIO 99 | DISTRIBUTOR 99 |

| UNAUTHORIZED COUNT | BLOCKED COUNT | REDIRECTED COUNT | REDIRECTED PURCHASES | <OTHER INFORMATION> |
|---|---|---|---|---|
| 7 | 7 | 2 | 1 | -- |
| ⋮ | ⋮ | ⋮ | ⋮ | ⋮ |
| 1 | 1 | 1 | 0 | -- |

FIG. 2

| FILE NAME: | FILESIZE | BITRATE | FREQ | LENGTH | USER | CONNECTION | PING |
|---|---|---|---|---|---|---|---|
| ● MUSIC\BRITNEY SPEARS - LUCKY.MP3 | 3,299,328 | 128 | 44100 | 3:27 | SHOULIN... | CABLE | N/A |
| ● MUSIC\BRITNEY SPEARS-07 - LUCKY.MP3 | 4,943,024 | 192 | 44100 | 3:27 | VEAUDY... | UNKNOWN | N/A |
| ● MUSIC\BRITNEY SPEARS - LUCKY.MP3 | 4,943,024 | 192 | 44100 | 3:27 | ERIN890 | CABLE | N/A |
| ● MUSIC\BRITNEY SPEARS - LUCKY.MP3 | 4,943,024 | 192 | 44100 | 3:27 | ALYSONF | CABLE | N/A |
| ● MUSIC\BRITNEY SPEARS - LUCKY.MP3 | 4,943,024 | 192 | 44100 | 3:27 | PISCESG... | UNKNOWN | N/A |
| ● MUSIC\BRITNEY SPEARS - LUCKY.MP3 | 4,941,824 | 192 | 44100 | 3:27 | IROC-Z... | T3 | N/A |
| ● MUSIC\BRITNEY SPEARS - LUCKY.MP3 | 4,941,824 | 192 | 44100 | 3:27 | BRY2K2K | 56K | N/A |
| ○ CHRIS\BRITNEY SPEARS - LUCKY.MP3 | 3,297,280 | 128 | 44100 | 3:27 | SNIPER5... | CABLE | N/A |
| ● MUSIC\BRITNEY SPEARS - LUCKY.MP3 | 4,943,824 | 192 | 44100 | 3:27 | S OLBY | 56K | N/A |
| ● MUSIC\BRITNEY SPEARS - LUCKY(VIDEO VERSION).MP3 | 5,046,272 | 192 | 44100 | 4:12 | ANIMULVS | UNKNOWN | N/A |
| ● MUSIC\BRITNEY SPEARS - LUCKY.MP3 | 3,300,623 | 160 | 44100 | 3:27 | DEUTSCH | CABLE | N/A |
| ○ B\BRITNEY SPEARS - LUCKY.MP3 | 4,491,824 | 128 | 44100 | 3:27 | FREDFL... | 56K | N/A |
| ● MUSIC\BRITNEY SPEARS - LUCKY.MP3 | 4,493,024 | 192 | 44100 | 3:27 | BABYAM... | 56K | N/A |
| ● MUSIC\BRITNEY SPEARS - LUCKY.MP3 | 4,493,024 | 192 | 44100 | 3:27 | ISE14 | UNKNOWN | N/A |
| ○ NEW FILES\BRITNEY SPEARS - LUCKY.MP3 | 4,493,024 | 192 | 44100 | 3:27 | DARENOU | 56K | N/A |
| ● MUSIC\BRITNEY SPEARS - LUCKY.MP3 | 4,942,896 | 192 | 44100 | 3:27 | AKATHC | CABLE | N/A |
| ● MUSIC\BRITNEY SPEARS - LUCKY.MP3 | 4,493,024 | 128 | 44100 | 5:07 | SOCCER... | UNKNOWN | N/A |

FIG. 16

COPYRIGHT DETECTION AND PROTECTION SYSTEM AND METHOD

PRIORITY CLAIM

This application is a continuation of U.S. application Ser. No. 11/048,307 filed Jan. 31, 2005, which issued on Jul. 21, 2009 as U.S. Pat. No. 7,565,327. U.S. application Ser. No. 11/048,307 is a divisional of U.S. application Ser. No. 10/116, 710, filed Apr. 3, 2002, which issued on Apr. 22, 2008 as U.S. Pat. No. 7,363,278. U.S. Pat. application Ser. No. 10/116,710 claims the benefit of U.S. Provisional Application Ser. No. 60/281,881, filed Apr, 5, 2005, U.S. application Ser. Nos. 11/048,307; 10/116,710; and 60/281,881 are hereby incorporated by reference as set forth herein.

BACKGROUND

1. Field

The field of the present invention relates to processing digital data. More particularly, the field of the present invention relates to identifying, reporting and/or protecting digital works from unauthorized transmission and/or copying, such as over networks or network segments connected to the Internet.

2. Background

Technological developments such as peer to peer file sharing have revolutionized the exchange of information over digital networks such as the Internet. The result has been a virtual explosion of copyright violations, as intellectual property is transmitted to individuals not licensed to receive and use it. Once copyrighted content is available on the Internet, that content is exposed to piracy. The unlicensed use of digital copyrighted works online is a growing, major concern to the owners of these properties. Current peer-to-peer file sharing technology facilitates widespread copyright infringement of various works including songs, images, and movies. At the same time, security measures placed into widespread use have been defeated. For example, DVD encryption was "backed" by mid-2000, resulting in the digital copying and distribution of movies without regard for copyright. As a result of the widespread availability of digital works on computer networks, artists and companies affiliated with them receive no payment for distribution of copyrighted works on an unprecedented scale.

In response to the growing copyright infringement problem tied to unregulated peer-to-peer file sharing, copyright owners have sought and obtained legal relief, including injunctive relief, against peer-to-peer facilitators such as Napster. Some copyright owners have further requested that network operators, including colleges and universities, block access to peer-to-peer sites to prevent further copyright infringement. At the same time, however, there exist substantial non-infringing uses for peer-to-peer file sharing, including exchange of creative works that exist in the public domain (such as may exist through expiration or abandonment of copyrights, for example) and/or uses that have been expressly permitted. If aggrieved copyright owners prevail in their legal battles against peer-to-peer facilitators, then such facilitators may be forced to stop operating irrespective of the content they provide.

The injunction entered against Napster in March 2000 by a federal judge in San Francisco, Calif. has ordered the company to remove copyrighted sound recordings from its system. The recording industry has been given the duty to provide lists containing the titles, names of artists, file names, and ownership rights of recordings, and Napster, shortly after receiving such identification, is responsible for blocking those materials from its system. Yet compliance with this name-based regime has already proven difficult, since there exists no file-naming standard and file names can be easily manipulated with known method presently in use. The inclusion of metadata (data about data, usually constituting text embedded in an audio file or stream to represent information such as artist name, album name, track name, etc.) in selected audio works may aid in identifying works even if file names are changed. However, metadata is only present on newer works, and essentially amounts to a more sophisticated extension of file naming technology that is subject to manipulation and hacking.

A potential alternative to relying on file naming technology for identifying digital works on computer networks is an identification technology known as watermarking. A watermark is digital information that is embedded into a file in such a way that it does not affect human perception of the content but is easily detectable by machines. One advantage offered by watermarking is its easy recognition. However, drawbacks of watermarking technology include its inability to protect the huge amount of previously released audio content, and its susceptibility to hacking. Once a watermark is disabled or removed from a creative work by a hacker, the resulting product is unprotected.

A different identification technology known as content-based identification ("CBID"), relying on the content of creative works, represents yet another alternative to file naming technology. For example, when applied to audio works, CBID analyzes acoustic qualities. Various CBID) techniques may be used to characterize the qualities of sound perceived by a listener. A typical approach is to analyze the spectrum of a sound, such as by measuring the loudness of each frequency contained in a multi-frequency sound.

A more compact CBID technology involves creation of a "fingerprint" from a creative work that is compact from a data perspective, yet preserves distinguishing characteristics that may be used to positively identify a unique audio file. Many simple fingerprinting methods have been developed, such as spectral averaging, for example. In using these simpler methods, however, a substantial amount of information about the audio work is lost. Great care must be taken in applying a particular CBID method for a number of reasons: not only to ensure only accurate identification, but also to ensure that compressed versions of an audio file can be identified, and to avoid known evasion techniques such as adding a small segment to the beginning of an audio file. A more sophisticated CBID technology would be appropriate to address these concerns.

One structural application of a sophisticated CBID fingerprinting method for audio data is found in U.S. Pat. No. 5,918,223, issued to Blum et al., the disclosure of which is hereby incorporated by reference as if fully set forth herein. The patent provides a system and method for performing analysis and comparison of audio data files based upon the content of the data files. However, U.S. Pat. No. 5,918,223 by itself does not address a comprehensive solution to regulating distribution of digital copyrighted works. Moreover, U.S. Pat. No. 5,918,223 expressly relates to audio information, and does not address the similar but distinct problems with regulating online distribution of copyrighted works such as motion pictures, still images, games, software, and other media.

Regarding movies, the transformation taking place in the motion picture industry from VHS video to digital DVD format has led to the spread of illegally shared copies of movies online. While a universal DVD encryption system has been adopted by the motion picture industry to block the online trade of illegal DVD content, as mentioned previously, decryption software such as De-Content Scrambling System (DeCSS) is readily available online. Moreover, technologies such as DivX allows users to take the decoded movie and copy the material onto a CD-ROM for home use through a standard Internet connection. The Motion Picture Association of America (MPAA) has moved aggressively to stop the illicit trade of movies online. The MPAA has sued online sites and chat rooms that offer pirated movies, as well as sites offering shared movie files, under the recently adopted Digital Millennium Copyright Act.

With regard to images, photo communities are quickly becoming a favorite new tool of online users, as such communities allow users to post, print, and share their photos online with other subscribers. The explosive growth in digital camera use has greatly expanded the popularity of these photo communities. While many sites promote their usefulness in sharing family moments and other important events online, some estimates provide that, in reality, half of all images posted on these sites are copyright-protected images, and are being posted, printed and shared illegally.

In summary, peer-to-peer file sharing technology offers unprecedented ease in exchanging information over digital networks. Unfortunately, this technology also permits intellectual property rights to be infringed on a widespread scale. Without a comprehensive protection system in place to prevent further infringement of intellectual property rights, if intellectual property owners prevail in their ongoing legal battles against peer-to-peer providers, then the benefits of peer-to-peer file sharing may be lost to everyone. In light of all of the considerations discussed above, it would be desirable to provide a reliable and secure system for enabling intellectual property owners to distribute digital materials while preventing infringement of intellectual property rights. Preferably, such a system would permit intellectual property owners to choose whether distribution of particular works should be unrestricted, restricted, or disallowed entirely.

BRIEF DESCRIPTION OF THE DRAWINGS

FIG. 2 is a sample report generated by a copyright protection system, the report including several data fields useful to record a transmission transaction.

FIG. 12b is a second portion of the annotated sequence diagram of FIG. 12a.

FIGS. 16-21 illustrate examples of screenshots that may be viewed by an intended recipient of unauthorized content in the context of a peer-to-peer file-sharing network.

DETAILED DESCRIPTION

Figure 1:
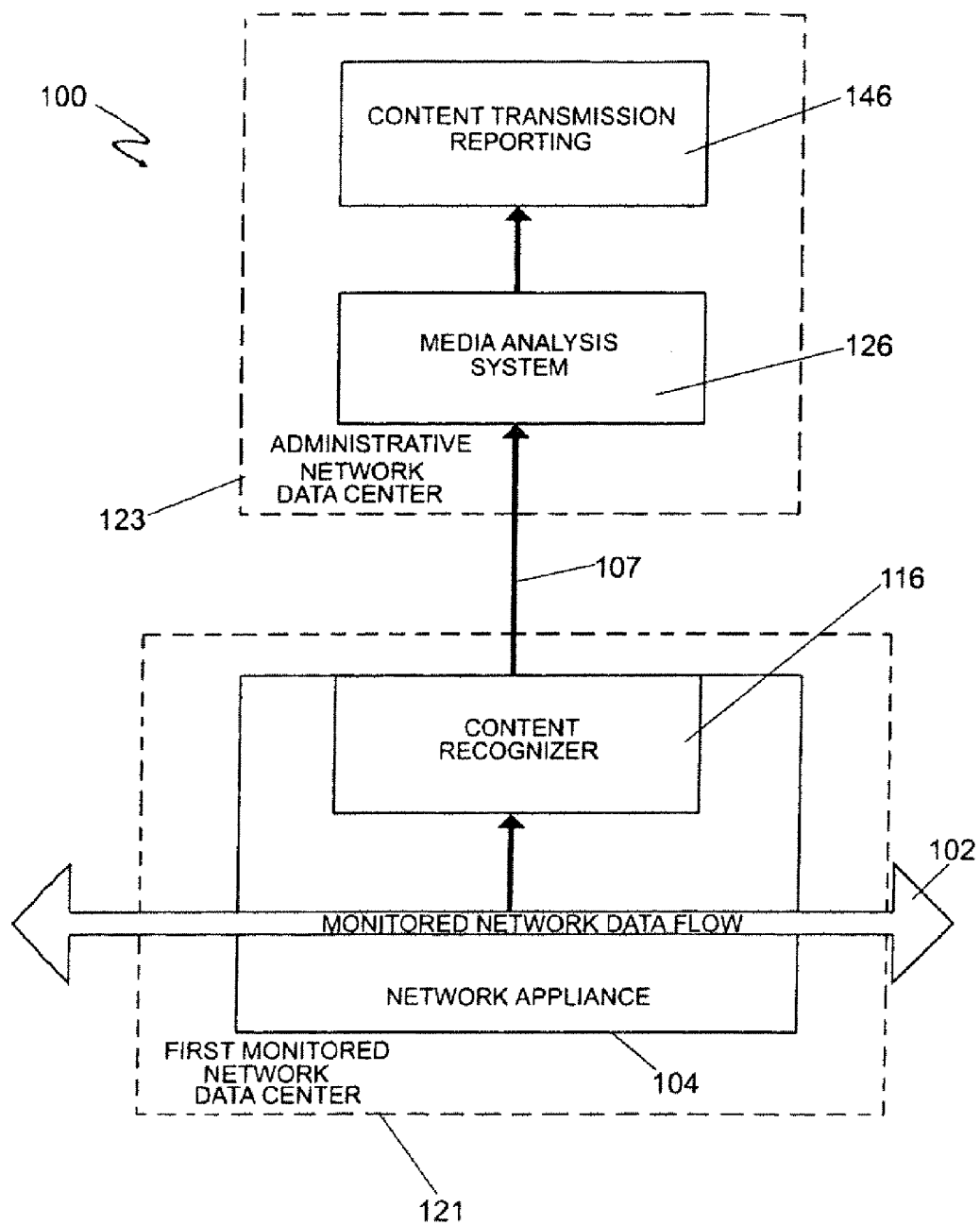
FIG. 1 is a high-level schematic of a copyright protection system according to a first embodiment.

FIG. 1 generally illustrates a copyright protection system ("CPS") 100 according to a first embodiment for monitoring a network segment 102 bearing at least one packet-based digital signal in accordance with one aspect of the CPS 100. In other aspects of the CPS 100, the monitoring point for a data transaction may be at points other than a network segment of a communication. For example, the monitoring point of the CPS may be a server on a community website that monitors the uploads of audio, image, video or other digital content. The same community website may alternatively monitor downloads of such data. Alternatively, the monitoring point may be a peer or client computer in a peer-to-peer file sharing network. In yet another embodiment, the CPS 100 may be integrated or linked with a search engine such as Excite® or Infoseek® that monitors search requests and performs one or more of the actions of monitoring, recording or blocking based on the nature of the request and the likelihood that it involves transacting copyright protected material. The network segment 102 is routed through a network appliance 104 that monitors digital signals borne by the segment 102. While FIG. 1 suggests that the network appliance 104 receives in-stream communications from the network segment 102, in other embodiments the network appliance 104 may alternatively receive mirrored data from a network. For an in-stream configuration such as is suggested by FIG. 1, each network appliance 104 would typically communicate with the network segment 102 through a router (not shown) having content recognition capability, such as routers commercially available from companies such as Cisco Systems or Alteon WebSystems (product information available at http://www.cisco.com and http://www.alteonwebsystems.com, respectively). Preferably, any digital signals borne by the network segment 102 are periodically sampled to obtain a frame of sample data on each occasion. As noted in U.S. Pat. No. 5,918,223, various window periods may be used for each frame, but each frame advantageously contains several milliseconds of data. A sampled frame is provided to a content recognizer 116, preferably part of the network appliance 104 that recognizes defined content types. Exemplary content types include .mp3, .avi, .asf, .ogg, but searching and recognition of practically any recognizable file type bearing audio, video, or image data, or digital text, or software, may be addressed by the content recognizer 116.

Upon recognition of the appropriate file type, a sampled frame is then provided to a media analysis system 126. The purpose of the media analysis system 126 is to assess the content of a digital file. While content may be determined according to different methods, one desirable method is to use digital content-based fingerprinting if sufficient processing resources are available. Preferably, a fingerprint is generated for the frame by the media analysis system 126 to aid in identifying the content of the frame. A generated fingerprint may then be compared with an archive of fingerprints for registered copyrighted works. "Registered copyrighted works" as used herein refers to digital works registered with or by a CPS provider or service provider. The existence of a fingerprint archive suggests that, in a preferred embodiment, copyrighted works should be registered with the provider of the CPS 100, and reference fingerprints should be generated from registered copyrighted works, before seeking to detect the transmission of particular works in a network segment 102. If the comparison between the fingerprint of the frame and an archived fingerprint yields a match, thus signifying the transmission of a registered copyrighted work along the network segment 102, then transmission information is recorded in a content transmission recording device 110.

As illustrated in the sample report provided in FIG. 2, several data fields identifying a transmission transaction may be recorded, including, for example, any one or more of the following:

a) Source IP Address: the Internet Protocol (IP) address from which the recognized content was transmitted;
b) Destination IP Address: the IP address to which the recognized content was transmitted;
c) Date Transmitted: the date the recognized media was transmitted;
d) Time Transmitted: the time the recognized media was transmitted;
e) Content/Media Name: The name or title of the content whether audio, video, still image, or other type;
f) Artist Name: The name of the artist (when appropriate) if the work is a copyrighted work already registered with the CPS provider;
g) Album Name: The name of an album (if appropriate) associated with a registered copyrighted (e.g., audio) work;
h) Record Label: The name of an album (if appropriate) associated with a registered copyrighted (e.g., audio) work;
i) Various Meta-Data: Distributor name, producer name, studio name, etc., such as may be found attached to a id3 or .md5 file or tag associated with the copyrighted work;
j) Unauthorized Count: The number of unauthorized downloads organized in various ways, such as by day, week, month, location, IP address, etc.;
k) Redirected Count: The number of redirected attempted downloads organized in various ways, such as by day, week, month, location, IP address, etc.

Figure 3:
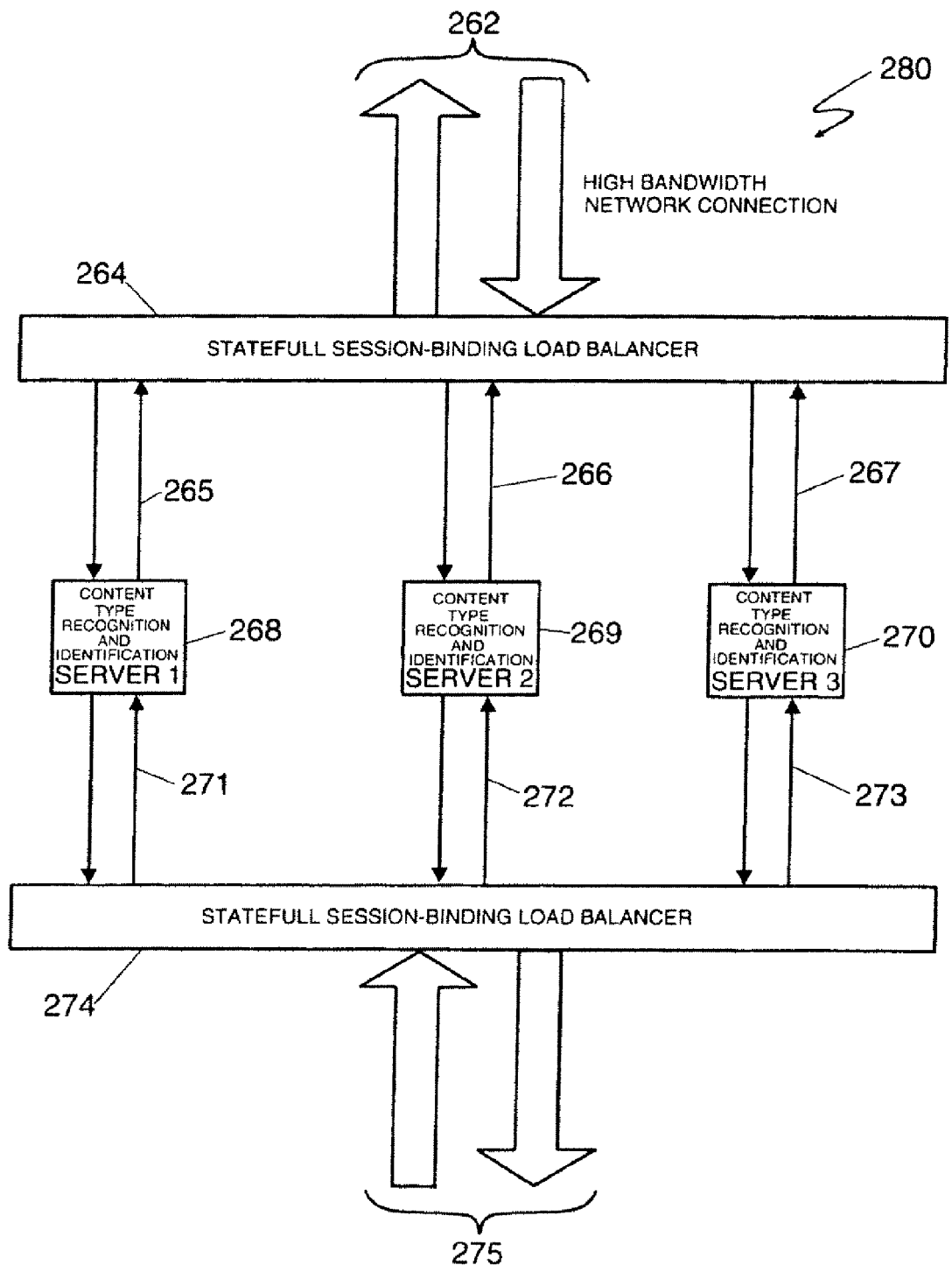
FIG. 3 is component architecture schematic for a portion of a copyright protection system directed to monitoring a multi-session digital signal.

Referring back to FIG. 1, various components of the CPS 100 may be optionally located remotely to one another and connected by a network connection 107. For example, certain components such as the network appliance 104 and a content recognizer 116 may be located at a first monitored network data center 121, while the remaining components 126, 146 may be located within a separate administrative network data center 123 FIG. 3 illustrates a preferred embodiment of a component architecture for a portion 280 of a CPS 100, such as the CPS 100 depicted in FIG. 1, the illustrated portion 280 being useful for monitoring a multi-session signal such as may be transmitted along a high bandwidth network segment. A high bandwidth network connection 262, preferably anticipated to operate at a convenient, commercially available speed, preferably greater than 28 kbps, communicates at least one packet-based digital signal to a first statefull session-binding load balancer 264 that separates the greater network stream into individual TCP or UDP sessions and binds those sessions to a specific processing unit (e.g., 268, 269, or 270) in the next layer. Connections 265, 266, 267 communicate individual network sessions to content-type recognition and identification servers 268, 269, 270, each having at least one processor. Each server 268, 269, 270, which preferably includes at least one processor, executes content-type recognition and content identification services. Within the servers 268, 269, 270, the raw IP data packets are assembled (or re-assembled), the packets are analyzed for presence of media types likely to contain copyrighted content using a content type recognition service, and the media content is identified using a content identifier service.

Though not shown in FIG. 3, the servers 268, 269, 270 preferably have further connections (remote or local) to a stored data repository to facilitate content comparison with known identifiers for copyrighted content using one or more processors. From the servers 268, 269, 270, packets may be communicated to a second statefull session-binding load balancer 274 that reassembles the various separated packets into a single network stream 275. Use of a second load balancer 274 to reassemble the separated packets into a single network stream 275 is generally only necessary if the portion 280 of the CPS 100 depicted in FIG. 3 is configured to operate in-stream. In such a case, the high bandwidth network connection 262 would typically be provided to the load balancer 264 by way of a router (not shown). Alternatively, if the CPS portion depicted in FIG. 3 receives mirrored network data, then the second load balancer 274 would be unnecessary, as there would be no need to reassemble separated packets into a single network stream 275 as the data is generally already streamed to its intended destination. Although not shown, additional redundant load balancers 264, 274, servers 268, 269, 270, and/or connections 265, 266, 267, 271, 272, 273 may be provided to provide failover (backup) capability in case one or more primary devices should fail.

Figure 4:
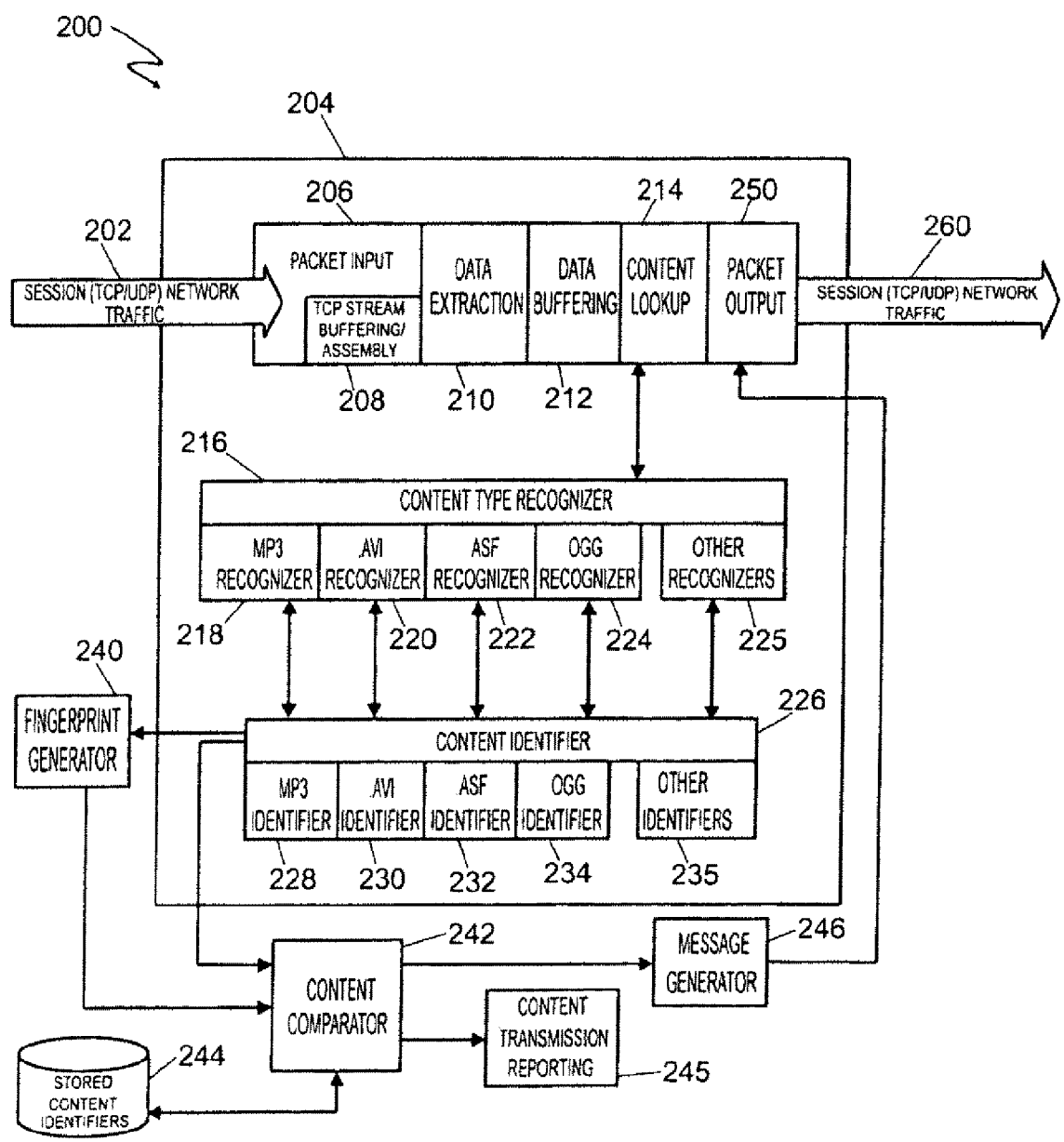
FIG. 4 is a schematic of a copyright protection system including implementation details for content type recognition and identification, in accordance with a second embodiment.

FIG. 4 depicts a preferred embodiment of a detailed implementation of a CPS 100, 200, omitting (for the sake of simplicity) load balancing devices such as are shown in FIG. 3 to focus on a single session. An incoming network data stream 202 carrying at least one packet-based digital signal, preferably separated by session, is provided to a network appliance 204. The network appliance 204 may be characterized as a server, and the various operational blocks contained within the appliance 204 may be characterized as services, each amenable to at least partial performance in software routines. The network appliance 204 includes at least one processor that, in conjunction with memory, operates software code for performing various operations on the digital signal. The processor may comprise any type of computer, and has processing characteristics dependent upon processing requirements for performing the various tasks discussed herein. It may comprise, e.g., a computer, such as a workstation including the type manufactured by Sun Microsystems, a main frame computer, or a personal computer such as the type manufactured by IBM® or Apple®.

The term "processor," as used herein, refers to a wide variety of computational devices or means including, for example, using multiple processors that perform different processing tasks or have the same tasks distributed between processors. The processor(s) may be general purpose CPUs or special purpose processors such as are often conventionally used in digital signal processing systems. Further, multiple processors may be implemented in a server-client or other network configuration, as a pipeline array of processors, etc. Some or all of the processing is alternatively implemented with hard-wired circuitry such as an application-specific integrated circuit (ASIC), a field programmable gate array (FPGA) or other logic device. In conjunction with the term "processor," the term "memory" refers to any storage medium that is accessible to a processor that meets the memory storage needs for a system or system component for performing the functions described herein. Preferably, the memory buffer is random access memory (RAM) that is directly accessed by the processor for ease in manipulating and processing selected portions of data Preferably, the memory store comprises a hard disk or other non-volatile memory device or component.

The network appliance 204 may be installed either in series with or receiving mirrored data from a high bandwidth network segment. Preferably, a packet input receiver 206 accepts the input of a network data stream 202. Associated with the packet input receiver 204 is a TCP stream buffering/assembly service 206 that identifies the packet type of the input signal, and if the type is TCP, also provides storage buffering as needed and assembles the synchronized packet stream. Thereafter, a data extraction service 210 extracts the data from synchronized network packets, and then a data buffering service 212 assembles and buffers the data from the incoming packets.

Following data assembly and buffering, a content lookup service 214 communicates part or all of the data to a content type recognizer service 216. Any portion not communicated with the content type recognizer service 216 may be communicated instead to a packet output service or transmitter 250. The content type recognizer 216 preferably has multiple associated recognizers 218, 220, 222, 224, 225 to recognize file types of interest including, for example, .mp3, .avi, .asf, .ogg, and other types, respectively.

Following content type recognition, packets are forwarded to a remote or local content identifier service 226 preferably having multiple associated identifiers 228, 230, 232, 234, and 235 to identify content borne by file types of interest including, for example, .mp3, .avi, .asf, .ogg, and other types, respectively Preferably, the content identifier service 226 is linked to a fingerprint generator service 240. While the fingerprint generator service 240 is illustrated as a distinct service from the content identifier 226, the two services optionally may advantageously be combined. Within the fingerprint generator 240, a content-based fingerprint comprising identifying features may be generated for a frame of data, and then forwarded to a content comparator 242. It may not be necessary to utilize a fingerprint generator 240 for identifying all digital files borne by the network data stream 202, as will be discussed hereinafter. Consequently, the content identifier 226 preferably includes a separate link to the content comparator 242 that is independent from the fingerprint generator 240.

The content comparator 242 is in communication with a database 244 of stored content identifiers, preferably by a high-speed network connection. The database 244 preferably includes database software such as is commercially available from Oracle® Corporation operating on one or more high-speed computers with expandable high-speed storage capability. The database 244 contains stored content-based identifiers, preferably including fingerprints, for copyrighted works registered with a CPS provider such as ipArchive™. For example, when a copyrighted song is registered with or by a CPS provider, the CPS provider would generate entries in the database 244 to assist in identifying the song, preferably including at least one fingerprint from the song's content according to a CBID method, such as the method disclosed in U.S. Pat. No. 5,918,223 issued to Blum et al. The CPS provider preferably indexes identifiers including fingerprints to registered works in the database 244. Fingerprints may be generated with a content identifier 226 with fingerprint generator 240, or with a media analysis system 326 such as provided in FIG. 5.

Returning to the content comparator 242, its function is to compare a content identifier (such as, for example, a fingerprint generated by the fingerprint generator 240) from the incoming data stream 202 and query the database 244 for stored identifiers for registered copyrighted works, and then determine whether the incoming data stream 202 matches with any archived content. If a match is found, then further actions may be necessary based on business rules associated with the identified content of, the data stream 202. Information identifying users, destination addresses, and/or passwords authorized to receive registered copyrighted content may be stored with the database 244, or, more preferably, in a separate database (not shown) communicating with the content comparator 242. The user/address/password information may be queried by the content comparator 242 to determine whether the data stream 202 is authorized.

A content transmission reporter 245 is preferably provided to record transmission information for copyright enforcement, record keeping, or other purposes. Information such as is listed above in connection with FIG. 2 may be stored, and reports such as the exemplary report provided in FIG. 2 may be generated. If the data stream 202 is not authorized, then one or more actions may be taken according to pre-defined business rules. Actions that might be taken according to pre-defined business rules, either separately or one or more in combination include, for example, recording, reporting and/or blocking a transmission, sending a generalized message to the source and/or recipient addresses involved with the unauthorized transaction, and sending a message informing a recipient address of (or redirecting a recipient address to) a commercial site where the desired copyrighted work may be purchased.

To facilitate messaging, a message generator 246 in communication with a packet output service or transmitter 250 is preferably provided. Preferably, messages are transmitted by way of an instant messaging protocol, such as the instant messenger associated with software distributed by www.napster.com, or AOL®. An alternative means for transmitting a message to a user is to send a message to a client application on the computer desktop of a user intended to receive the content, the client application including some communication capability. The CPS may detect an available client application, and then send the message accordingly. For example, the system may detect an Internet Explorer® on the user's desktop and send an HTML message to the user via the user's Internet Explorer®.

A transmitted message preferably provides instructions, or, more preferably, a link to a commercial site, for purchasing a license to the copyrighted work. In one embodiment, the recipient of the message is provided the option of contesting the blocking of the content. If the recipient chooses to contest the block, a return message is sent to the CPS 100, which then may immediately commence transmission of the digital data to the recipient. Alternatively, the CPS 100 may forward the contested data stream for additional identification processing or to an administrator of the CPS for review. In one preferred embodiment, the recipient is provided a small sample of both the transmitted content and the content to which it matched to enable the recipient to make an evaluation of whether to contest the block. For example, if the content is an image, thumbnails of the image and the matched image may be presented to the recipient side by side on the recipient's browser.

Figure 17:
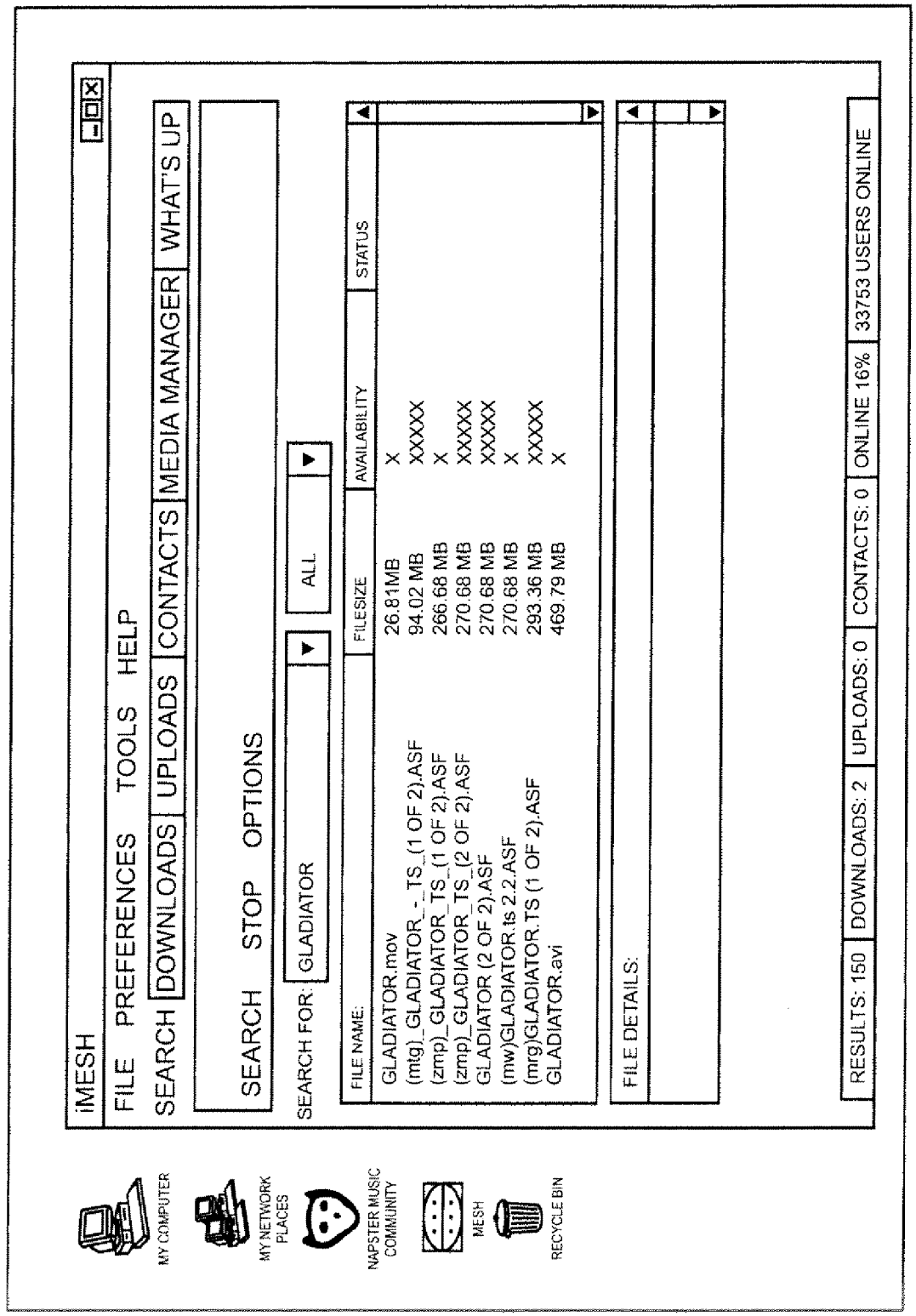
Figure 18:
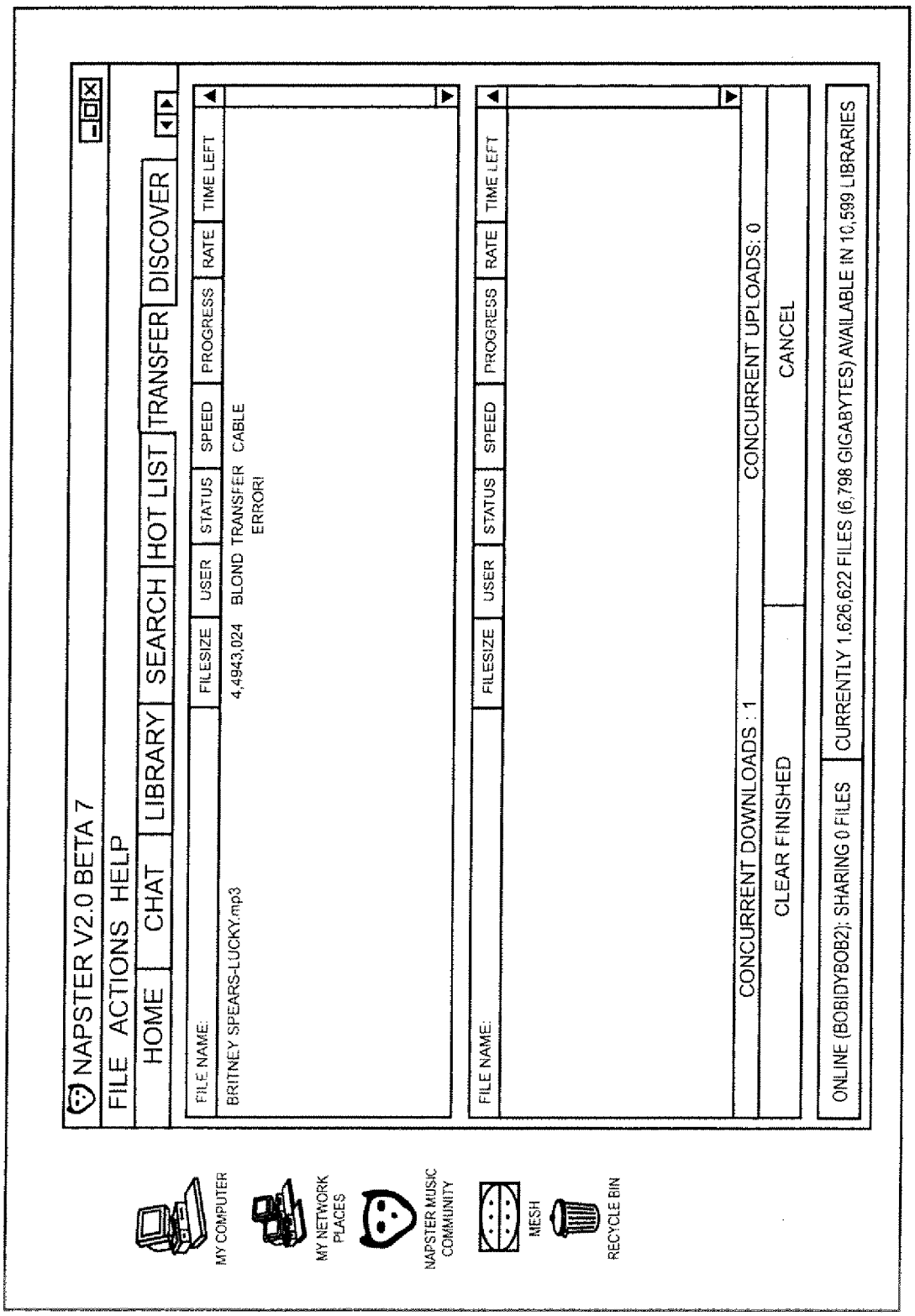
Figure 19:
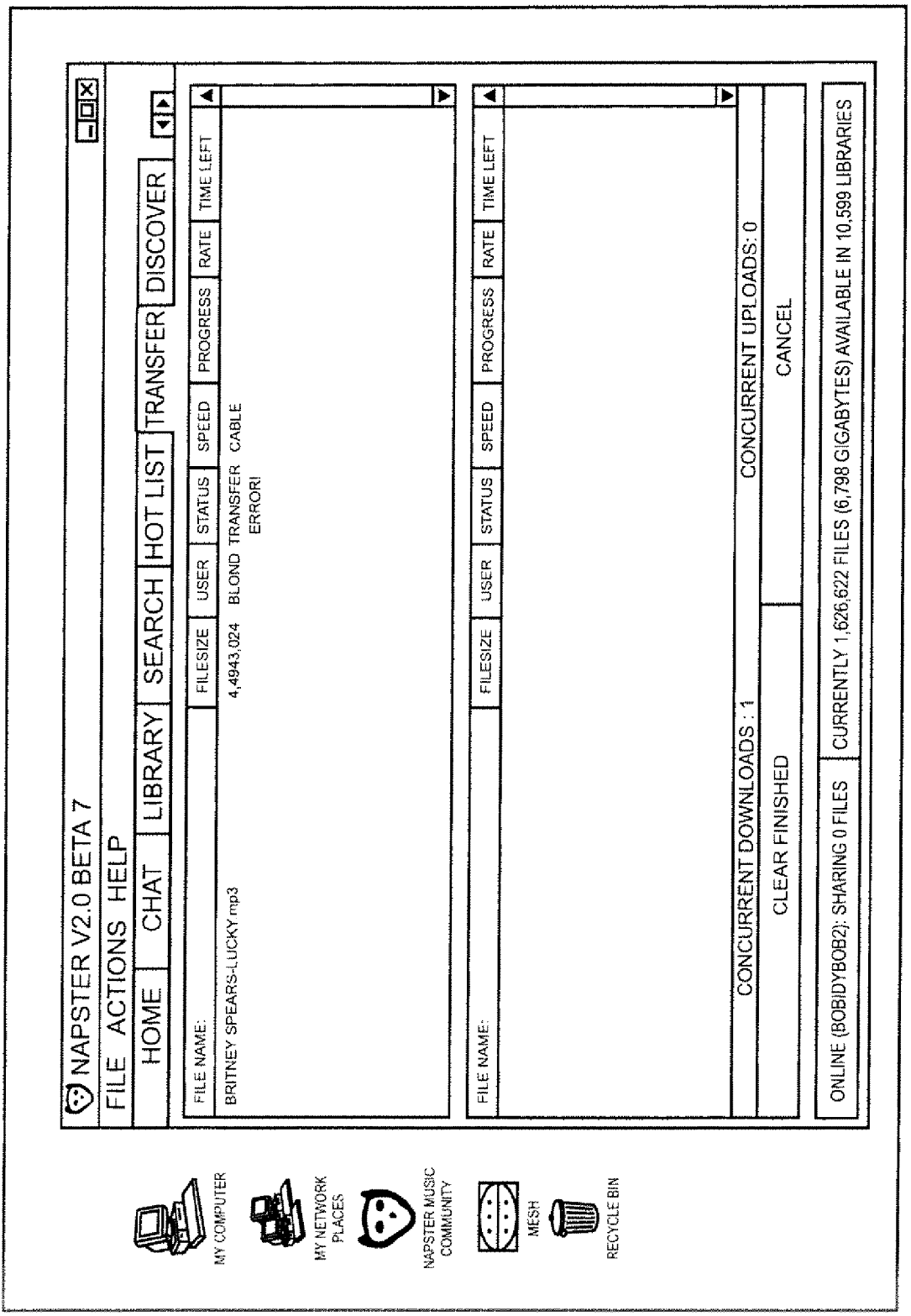

FIGS. 16-21 illustrate examples of screenshots that may be viewed by an intended recipient of unauthorized content in the context of a peer-to-peer file-sharing network. FIGS. 16 and 17 depict examples of screenshots as may be viewed by a user using a peer-to-peer file sharing client application (FIG. 16 for Napster and FIG. 17 for iMesh). The screenshots depict a list of songs that the intended recipient may choose to receive. In FIG. 18, a file sharing client application (e.g., such as for Napster) includes a window that depicts the status of a file transfer. When the CPS intercedes in the transfer, the intended recipient may view a "Transfer error!" message on the client application. In one embodiment, this may be the complete and only message that is communicated b the CPS to the intended recipient. The intended recipient may not even be aware that the content has been affirmatively blocked, as the message may appear to indicate a communication problem or fault. Similarly, in FIG. 19, the message received is "Timed out!," which may or may not indicate to the content's intended recipient the reason for the failed transmission of the content. The specific action taken may depend on business rules associated with the content. The business rule may be construed to only report on the transmission and take no action to interfere with the transmission.

Figure 20:
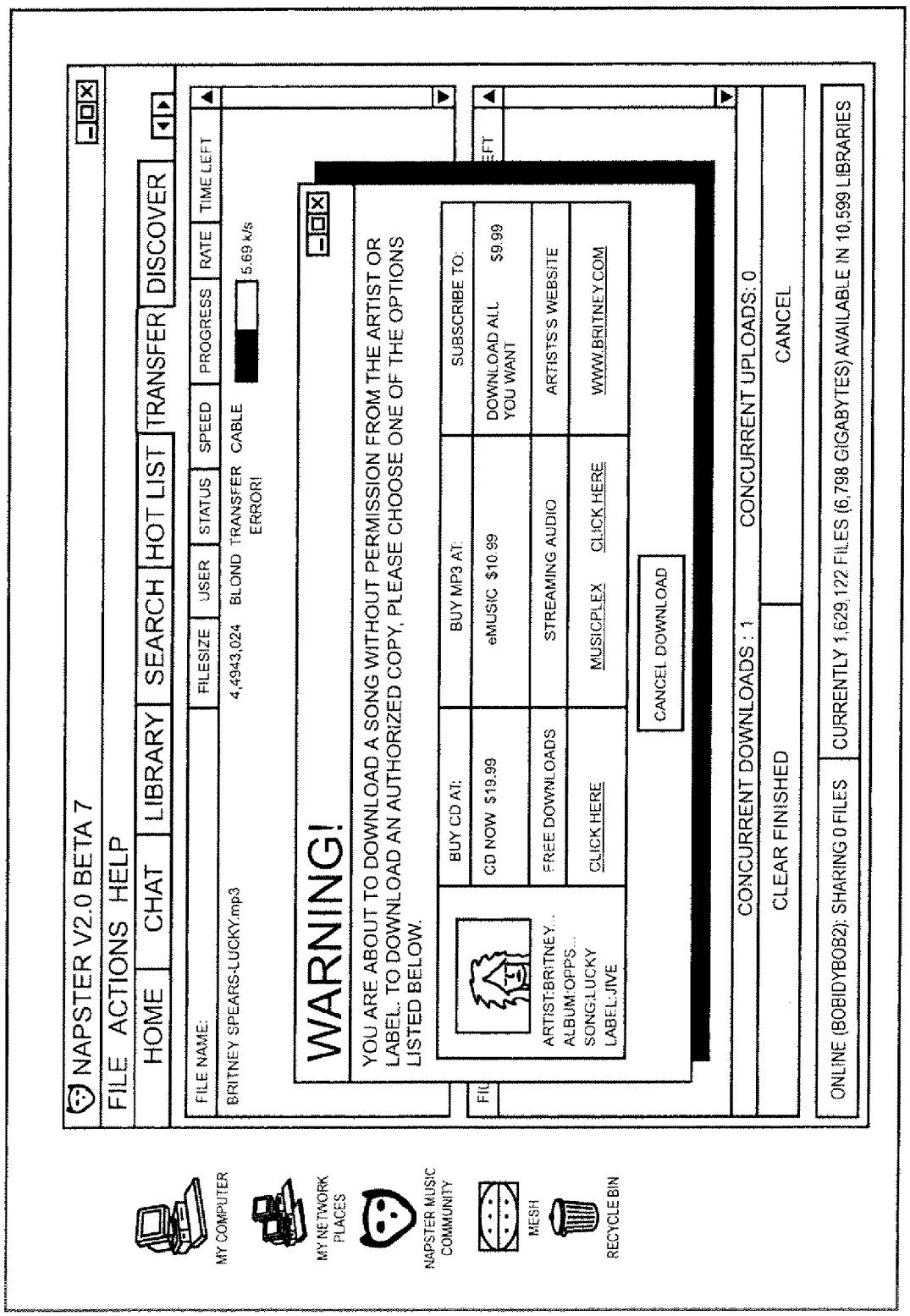
Figure 21:
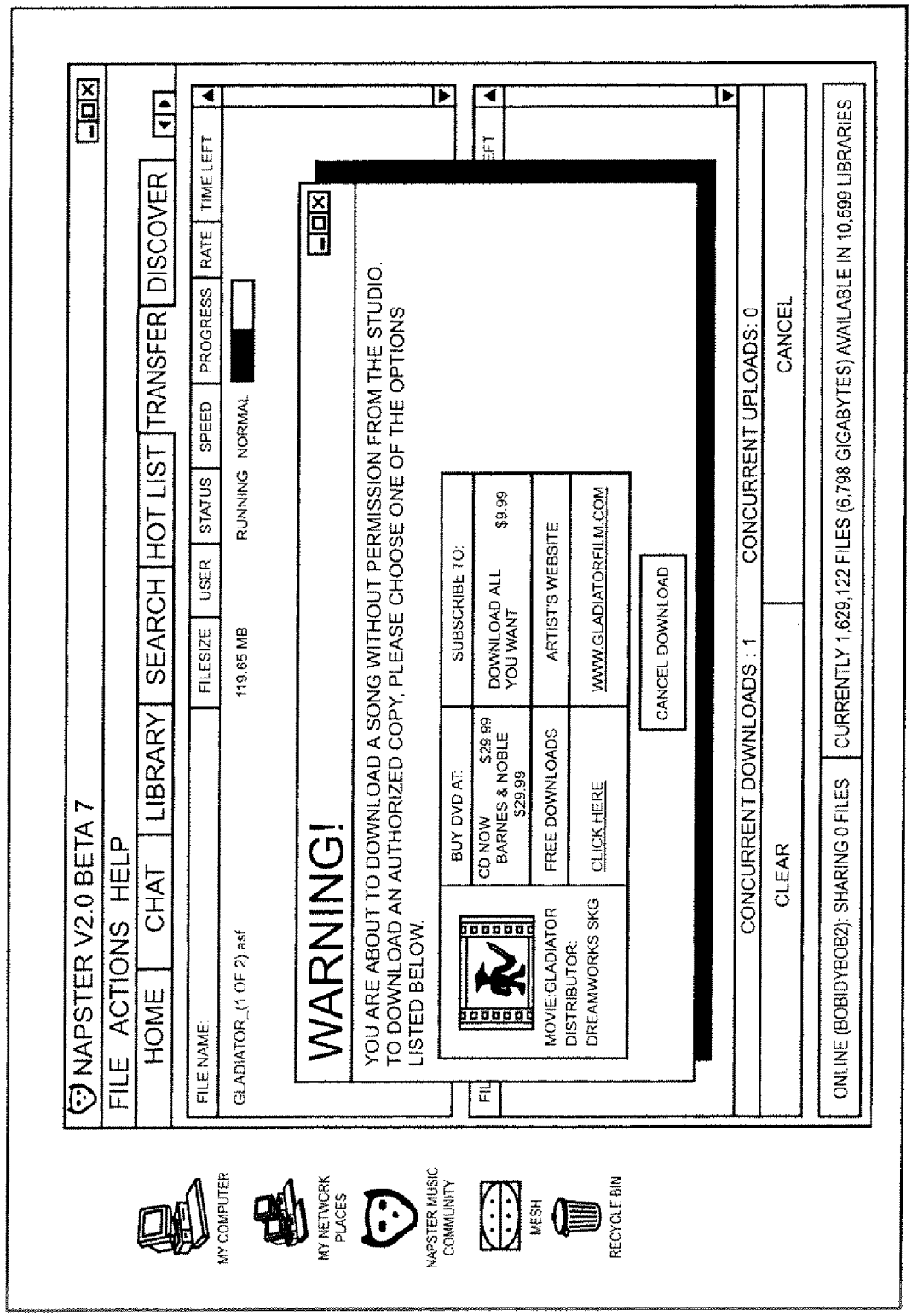

FIGS. 20 and 21 depicts examples of screenshots of windows that, in one alternative embodiment, may be presented to an intended recipient of unauthorized content. The windows preferably provide options to the viewer for obtaining the desired content from other sources, which are authorized to distribute the desired content, although typically for a fee.

Blocking or interrupting an unauthorized transmission may also be performed by way of the message generator 246, such as by transmitting a TCP/IP reset. This well-known technique is a form of IP spoofing in which the message generator 246 alternately gives the appearance that it is the transmitting device and the receiving device associated with a transaction, and then forges packets designed to terminate a TCP stream According to this blocking method, an unlicensed and unauthorized destination address or recipient may be prevented from receiving full transmission of a specific registered copyrighted work. The forged packets are independent of any assembled content-bearing packets that may also be provided from the packet output service or transmitter 250 to a continued network traffic stream 260.

Figure 5:
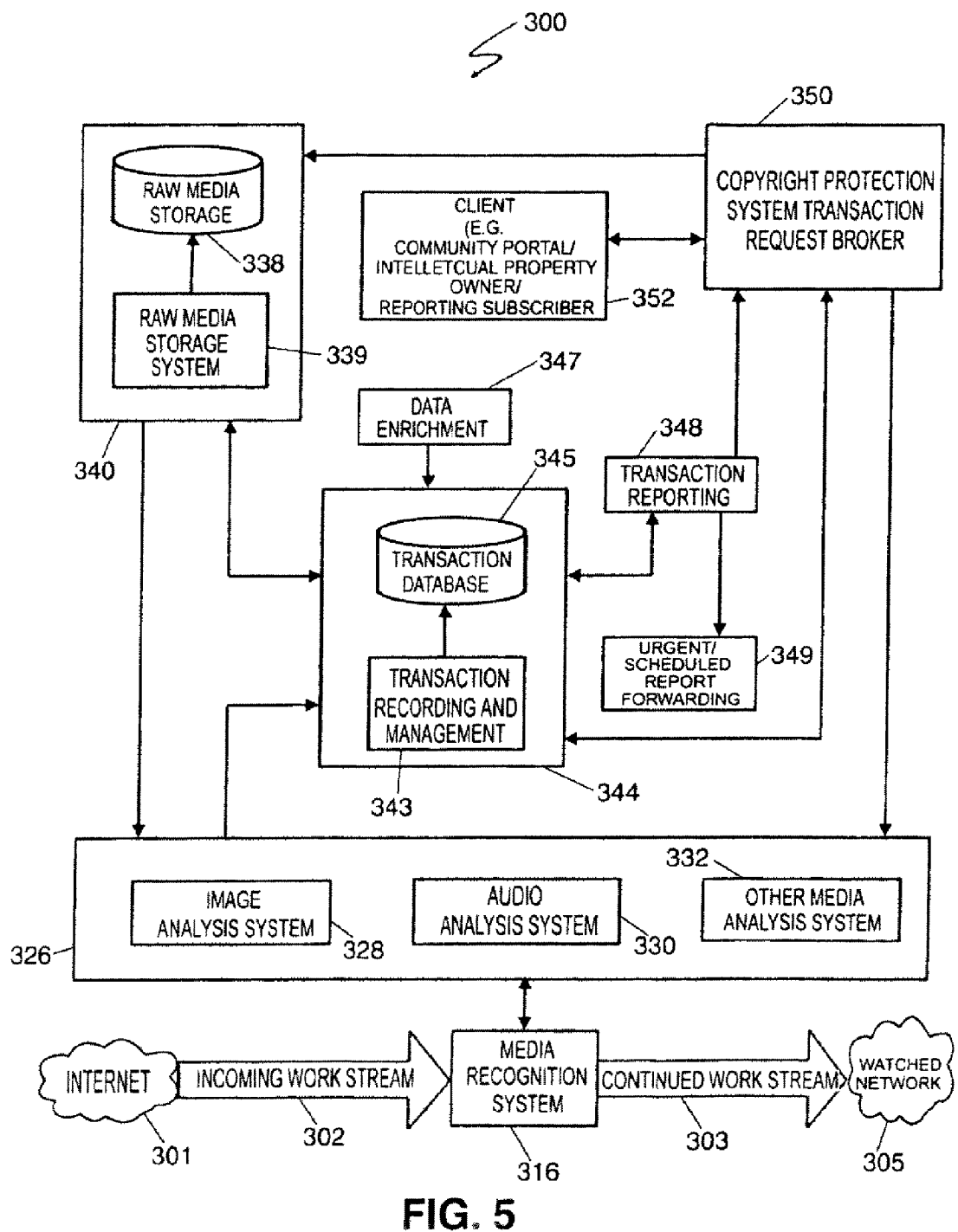
FIG. 5 is a schematic of a copyright protection system according to a third embodiment.

As noted previously, a continued network stream 260 suggests that the network appliance 204 is installed in-stream along a network segment. However, the appliance 204 may also be configured to receive mirrored network data, in which case the need to continue transmission of reassembled packets through the packet output service or transmitter 250 to a continued network stream 260 may be reduced or obviated. FIG. 5 is a schematic representation of an alternative copyright protection system 300. An incoming network stream 302 connected to the Internet 301 is routed to a media recognition system 316 provided at a network watchpoint. The media recognition system 316 includes an input receiver (not shown) for receiving an incoming network stream 302. If the media recognition system 316 is placed in-stream to capture all network communications, then an output transmitter (not shown) for transmitting the continued network stream 303 en route to a watched network 305 is preferably provided. The media recognition system 316 may also be configured to receive a mirrored network data stream according to conventional techniques. An in-stream approach requires additional, often expensive routing hardware (not shown), and may have a potential drawback of introducing latency into the monitored network stream. A potential benefit of an in-stream approach is that it may facilitate blocking of an entire transmission before any portion of it is transmitted to the watched network. The latter approach, implemented using mirrored network data, is preferred if it can be implemented at sufficient speed to render it effective at identifying and taking action against unauthorized transactions before such transactions are completed.

Figure 8:
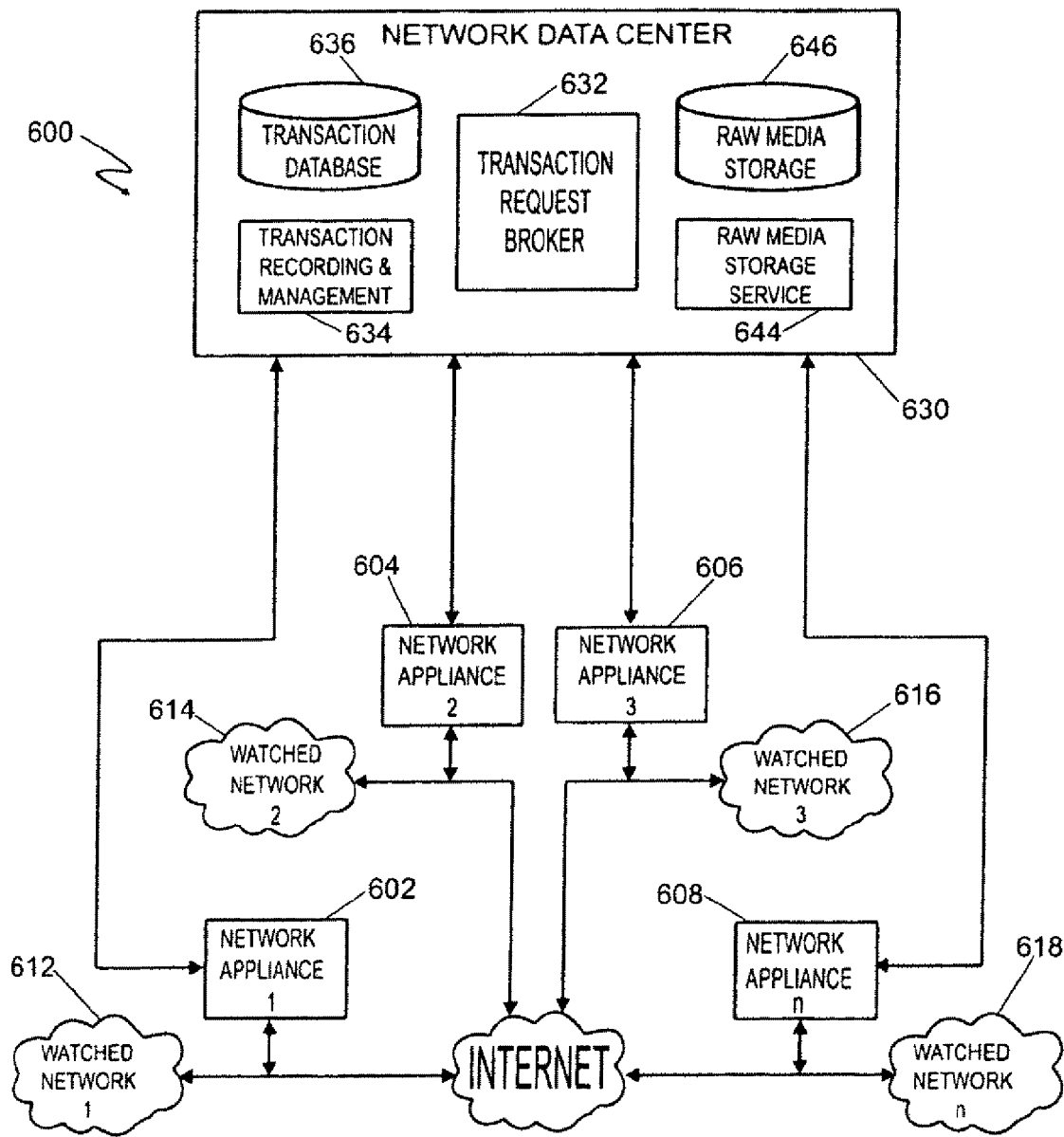
FIG. 8 is a schematic of a copyright protection system having a distributed architecture for monitoring multiple watched networks.

Preferably, multiple networks may be monitored by the copyright protection system 300 with additional media recognition systems 316 (such as embodied in the multiple network appliances 602, 604, 606, 608 shown in FIG. 8) each monitoring a segment of a different network but communicating with common analysis systems and/or a common transaction request broker. Each media recognition system 316 advantageously monitors a network 305 for traffic in digital files such as, for example, video, audio, image files and other digital content.

If a file type of interest is detected by the media recognition system 316, then any portion of the signal bearing such a file may be provided to the content analysis system 326 to perform content identification. There, separate media analysis subsystems 328, 330, 332 are provided for analyzing images, audio, and video or other media (including software) respectively. Image identification may be facilitated by use of the Ereo Exacta-Match system, developed by and commercially available from Ereo. Audio identification may be performed by application of the methods disclosed in U.S. Pat. No. 5,918,223, issued to Blum et al. or alternatively with the Stochastic Audio Matching Mechanism (SAMM) discussed below. Video identification may be facilitated by applying one or both of the above-mentioned CBID methods to the audio portion of the video file, if any. Other digital works, such as digital text or software, may be identified by any number of methods as are known in the art.

The media analysis system 326 preferably includes a capability of generating CBID fingerprints for digital media, whether such media is obtained from an incoming network stream 302 by way of the media recognition system 316, or obtained from a raw media storage service 340. Preferably, the media analysis system 326 also includes storage capability to store content identifiers or fingerprints for registered copyrighted works, such as may be stored in and forwarded by the raw media storage service 340. The media storage service 340 preferably contains a raw media storage archive or database 338 and a raw media storage system manager 339 for managing transactions with the archive or database 338.

Returning to the media analysis system 326, a further function of the system 326 is to compare identifiers, preferably including fingerprints, extracted from the network stream 302 and from registered copyrighted works (such as are stored in the media storage service 340) to determine whether the network stream 302 contains any registered copyrighted content. If the media analysis system 326 finds a match in making this comparison, then it may forward information regarding the transaction to a transaction database service 344.

Within the transaction database service 344, a database 345 stores all media received by the media analysis system 326. The database 345 is preferably relational to facilitate dimensional reporting, and preferably also permits high volume updates. A transaction recording and management service 343 is provided to manage queries to the database service 344 and also to manage data recordation in the database 345. Preferably, a data enrichment service 347 in communication with the database service 344 is provided to facilitate either automatic or manual addition of information potentially useful to the CPS (such as according to the method provided in FIG. 7).

A transaction reporting service 348, also is communication with the database service 344, is preferably provided to define and execute queries for generating reports including, for example, the transaction information provided in FIG. 2. Preferably, transaction reports may be sold by the CPS provider to owners of copyrighted works to communicate information useful for maximizing opportunities and revenue from the copyrighted works. An urgent or scheduled report forwarding service 349 is preferably provided and in communication with the transaction reporting service 348 to coordinate generation of urgent or scheduled reports. Preferably, reports may be delivered by way of email or another active, preferably electronic, delivery system to a client 352.

The transaction reporting service 348 is preferably in connection with a CPS transaction request broker service 350 that coordinates and manages various components of the CPS 300. The broker service 350 may be used to handle requests from the transaction reporting service 348, coordinate and/or manage operation of the media analysis system 326, handle requests of the transaction recording service 344, coordinate operations and data flows associated with the media storage service 340, and finally handle requests by and from the client 352. The client 352 preferably includes a web application interface providing access to intellectual property owners, reporting subscribers, and/or the community at large.

Reference has been made in the foregoing discussions to identifying the presence of a copyrighted work in a digital signal by way of content-based fingerprints. Such a methodology (as was described, for example, in connection with FIG. 1) provides but one way of performing content identification. While the method described in connection with FIG. 1 is highly accurate, it may not be optimal to apply such a method to all digital files borne by a network segment due to the generally processor-intensive nature of fingerprint generation and comparison. If a copyright protection method is applied in-stream to intercept network traffic, then ensuring rapid identification speed is desirable to minimize latency.

Alternatively, if a copyright protection method is applied to mirrored network traffic, then it is important to ensure that content for a particular transaction in a registered copyrighted work is identified before the entire transaction is completed. For example, in the case of an unauthorized attempt to download a digital movie over a network, preferably the content of the movie is identified before the download is completed. Given limited processing resources, as traffic over a network increases, it may become difficult to generate and compare fingerprints for all network transactions with acceptable speed. Consequently, resort to a hierarchical method to assess the likely content of a digital signal being transmitted over a network may be desirable to ensure acceptable speed with finite processing resources.

Figure 6:
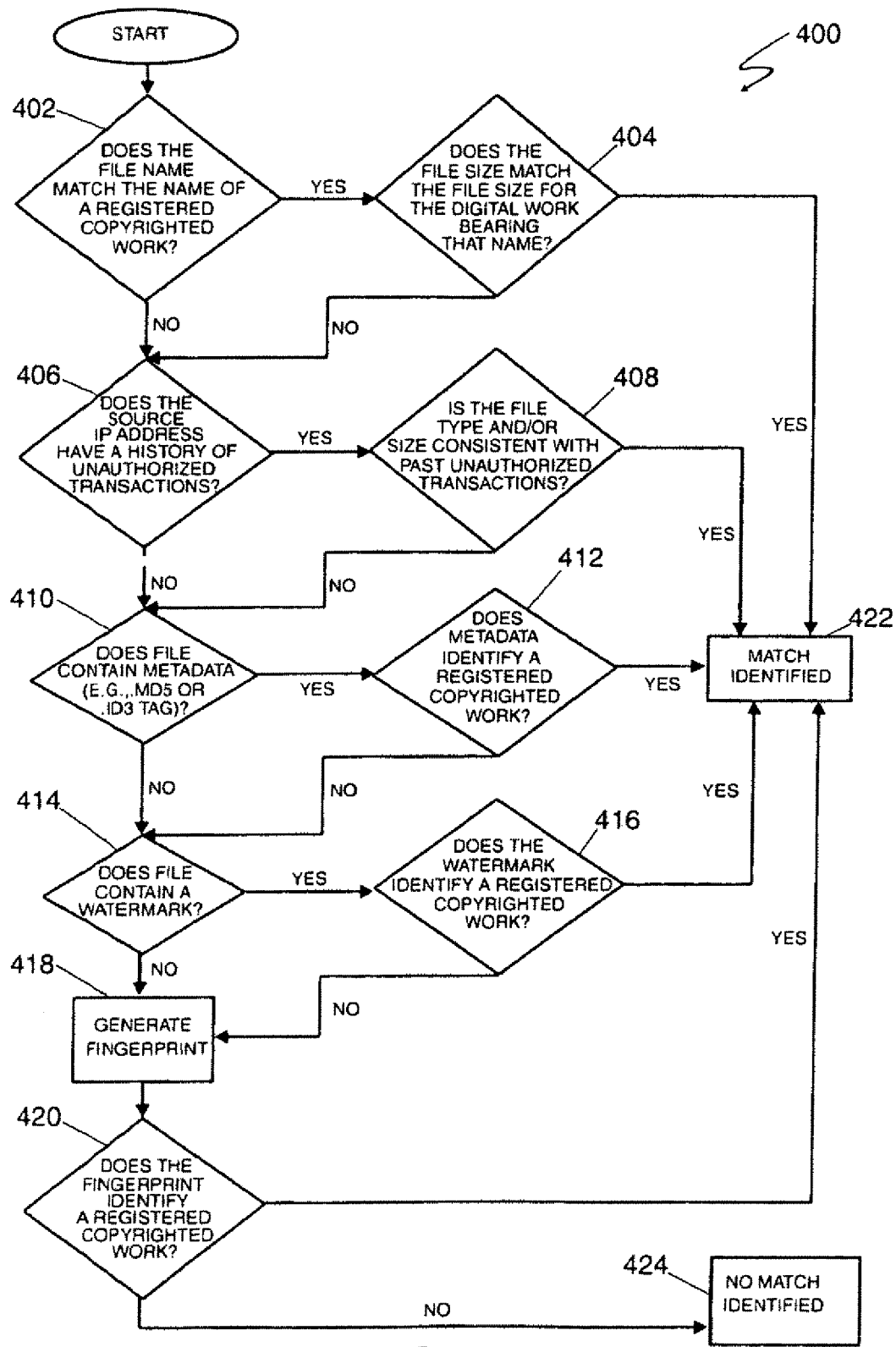
FIG. 6 is a process flow diagram for a hierarchical method useful with a copyright protection system to assess whether a digital file contains a registered copyrighted work.

FIG. 6 illustrates one embodiment of a hierarchical identity assessment method 400 that may be used in a CPS 100, 200, 300. A guiding principle of this method is to start with less processor-intensive steps to assess whether the monitored transmission contains a registered copyrighted work, and then to progress to more processor-intensive steps only if early steps do not indicate a match. Preferably, the method depicted in FIG. 6 is embedded in a software routing that may be operated on a computer processor, such as is contained in the network appliance 204 illustrated in FIG. 4. The method illustrated in FIG. 6 assumes that content type, file name, file size, IP addressing, any metadata, and/or watermarks may be discerned or extracted from a digital sample. Preferably, as a precursor to any assessment of the digital content that is transmitted, actions such as content blocking or content transmission reporting may be performed based on other aspects or attributes of the data stream. For example, an action may be taken based on the source IP address. Content blocking, for example, may be performed based on protocol (e.g., Napster, Gnutella, etc.). Alternatively, content transmissions may be acted on based on the Internet Service Provider such as AOL®, used by the sender or the intended recipient of the content.

Utilizing file naming as one assessment criterion, the first step 402 is to compare the file name of the sample to file names of registered copyrighted works contained in a database (such as the database 244 illustrated in FIG. 4). If the file name of the digital sample matches a name in the database, then a checking comparison step 404 is preferably performed to compare the file size for the digital sample to the expected file size of the registered copyrighted work bearing that name in the database. If both the file name and file size appear to match, then the likelihood that the digital sample contains a registered copyrighted work considered is high, and a file match may be established according to block 422. Comparison of file names and file sizes is generally straightforward and does not consume substantial processing resources. Alternatively, the determination as to whether a match exists may be based only on the filename or the file size.

If the file name and file size do not both match, then a second assessment criterion involving a history of unauthorized transactions from a particular source address is preferably applied, according to step 406. As discussed previously, information recording various aspects of transactions in copyrighted data may be maintained in a database, such as the database 244 illustrated in FIG. 4. Representative aspects that may be recorded include the source and recipient IP addresses, the type and identity of copyrighted files, and the number and frequency of transactions or attempted transactions. If a particular source IP address generates a history of unauthorized transactions, especially involving files of a certain type, then the likelihood is elevated that a data stream emanating from that source IP address contains unauthorized copyrighted material. Accordingly, steps 406 and 408 examine whether a source IP address has a history of unauthorized transactions, and, if so, whether the file type and/or file size is consistent with past unauthorized transactions. If both questions are answered in the affirmative, then a file match may be established according to block 422. Querying a database for suspect source IP addresses and file types and/or sizes implicated in past unauthorized transactions is generally less processing-intensive than generating and comparing content-based fingerprints.

If examination of the source IP address and file type and/or size do not yield a likely match with a registered copyrighted work, then further assessment criteria using any present metadata or watermarks are preferably applied, according to steps 410-416. If metadata is present in the file according to step 410, and the metadata identifies a registered copyrighted work according to step 412, then a file match is preferably established according to block 422. If either of these questions is answered in the negative, then preferably the following inquiry is whether the file contains a watermark according to step 414. If a watermark is present, and the watermark identifies a registered copyrighted work according to step 416, then a file match may be established according to block 422. Identification by way of metadata or a watermark may be performed by reference to archived data, such as may be stored in the database 244 illustrated in FIG. 4. Inquiring into the presence of metadata or watermark information and querying archived data to compare these identifiers is preferably performed in advance of fingerprinting to achieve desirable speed characteristics if processing resources are limited.

If none of the foregoing assessment criteria indicate the likely presence of a registered copyrighted work, then a content-based fingerprint for a digital sample may be generated according to block 418. But even if one or more of the foregoing assessment criteria indicates a match with a registered copyrighted work, it may be desirable to check at least a portion of the matched results with a fingerprint identification method for validation purposes. That is, each of the foregoing assessment criteria provides only a probability that the unknown content contains a registered copyrighted work. Using fingerprinting techniques to check at least a portion of results matched according to other assessment methods may preferably provide feedback as to the effectiveness of a particular hierarchical identity assessment method.

As noted previously, identification by way of content-based fingerprints is highly accurate, but a primary downside in using fingerprinting is its high consumption of valuable processing resources. Following fingerprint generation, the fingerprint may be compared to an archive of identifiers for registered copyrighted works according to step 420. The archived identifiers may be stored in a database, such as the database 244 illustrated in FIG. 4. If fingerprint comparison identifies a registered copyrighted work according to step 420, then a file match may be established according to block 422. Alternatively, if fingerprint comparison identifies no match according to block 424, then it may be concluded that the digital sample does not correspond to a registered copyrighted work. In such an instance, it is desirable to store the fingerprint in an archive, such as the database 345 illustrated in FIG. 5, to enable retroactive reporting. That is, it may be desirable to monitor transactions in a particular digital work in case an owner of that work later desires to register it with the CPS provider and would like to obtain information regarding transactions in that work pre-dating registration of the work. Depending on the number, frequency, and/or timing of transactions in a particular work, a copyright owner may recognize the benefit of registering the work and/or choose one or more particular business rules to provide an appropriate and desirable level of copyright protection.

When a copyright owner should decide to register a particular work with the CPS provider, one task for the CPS provider is to gather and/or enter potentially useful data corresponding to that work into a database or archive, such as the archive 338 illustrated in FIG. 5. This task may be generally described as data enrichment. Preferably, data enrichment is automated to the extent possible, but manual intervention may be desirable, such as to augment information available to an automated data enrichment service and/or to check and control the quality of automatically entered data. Numerous data fields may be useful in operating a CPS or providing copyright protection services in accordance with the present invention, such as, for example, file name, file size, a content-based fingerprint, commerce artist name, label name, album name, producer name, release date, and others.

Figure 7:
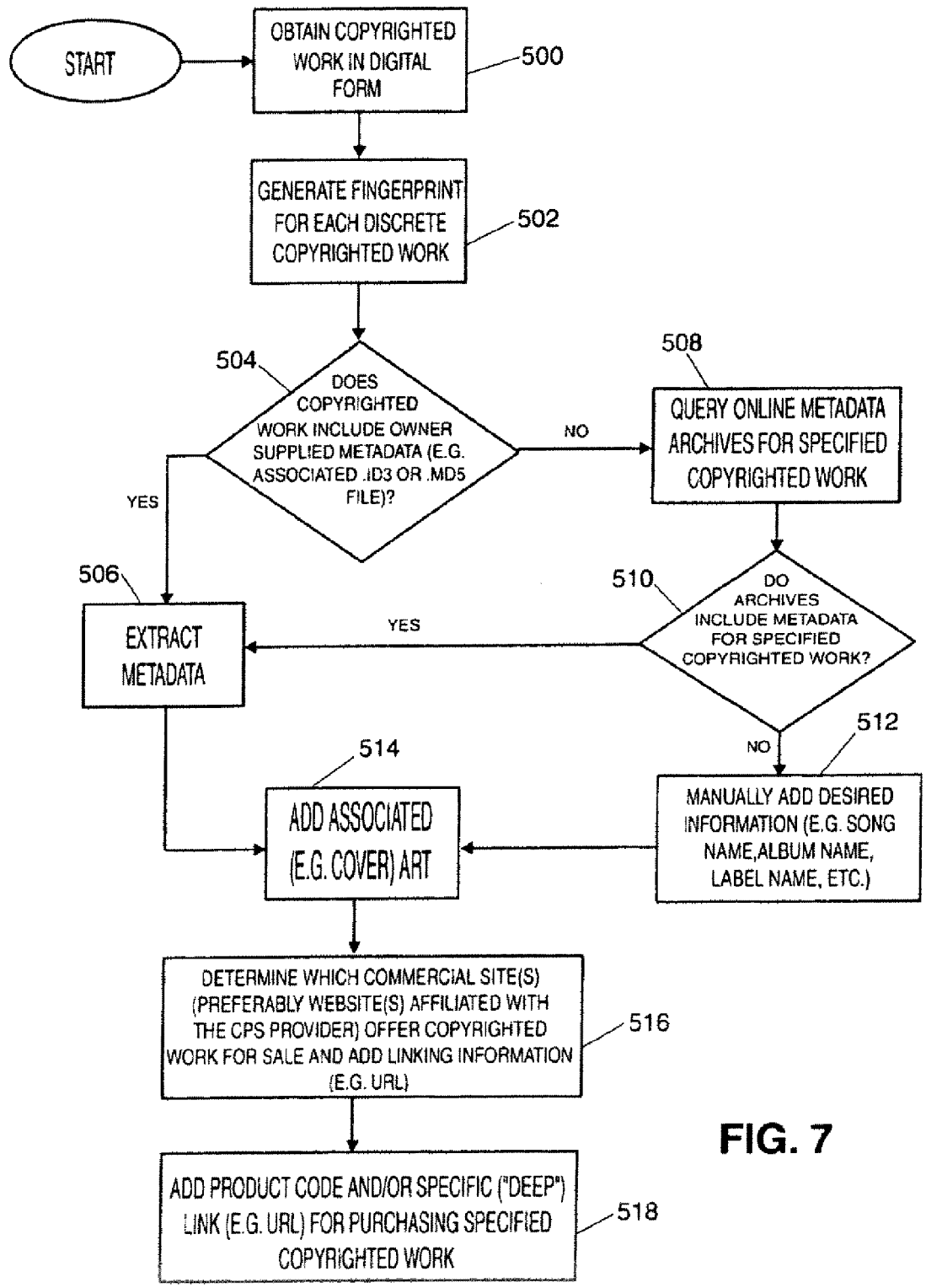
FIG. 7 is a process flow diagram for obtaining and entering information useful to a copyright protection system into a database.

FIG. 7 provides an example of a procedure for data enrichment. The first step 500 is to obtain the copyrighted work to be registered in digital form. The CPS provider may obtain digital files, for example, by way of transmission over a network such as the Internet, or by way of a portable digital storage medium such as a CD or DVD. If necessary, the CPS provider may receive an analog copy or a hard copy of a copyrighted work, such as a cassette tape or a photograph, and convert it to digital form. The next step 502 to generate a fingerprint, preferably for each discrete digital work. If an entire music album were provided to the CPS provider, then a separate fingerprint would preferably be generated for each song on that album to facilitate identification of individual songs by the CPS.

A CPS may use Metadata. Inquiry into the presence of owner-supplied metadata may be performed according to step 504. Owner-supplied metadata, which may be found, for example, in a format such as an .id3 or .md5 file associated with the digital work, may be extracted according to block 506. Types of metadata that might be extracted include, for example, artist name, title of the song/movie/work, album name, company/owner name, producer name, release date, and similar information. If no owner-supplied metadata is present, then online metadata archives is preferably queried for the specified copyrighted work according to step 508. Examples of online metadata archives that may be queried for such information include "FreeDB" and "CDDB." If the online archives include metadata for the specified copyrighted work according to block 510, then the metadata is preferably extracted according to step 506 for use in the CPS. If no metadata is available for the work in such a database, then desired information may be added manually according to step 512. Following addition of metadata, any art associated with the work may be added to a CPS database, such as the archive 338 illustrated in FIG. 5. Such associated art may include, for example, an album cover for an audio work, a thumbnail of an image work, or movie art.

Following addition of metadata information and associated art, preferably a query is performed to determine which commercial site or sites, if any, offer the particular copyrighted work for sale according to step 516. Preferably the commercial site(s) are online websites, and more preferably websites affiliated with the CPS provider such as by contractual affiliation. Address information, preferably in the form of a URL, for commercial websites having the work for sale is then associated with the copyrighted work in a CPS database. A final step may be the addition of a "deep" link (such as a URL) or product code for purchasing the specified registered copyrighted work from the commercial site according to step 518. The foregoing information may be useful in facilitating commercial transactions in registered copyrighted works.

FIG. 8 illustrates an implementation of a CPS 600 utilizing several network appliances 602, 604, 606, 608 distributed along network segments for several watched networks 612, 614, 616, 618. Each watched network 612, 614, 616, 618 connects to a distributed electronic network such as the Internet 620, and each network appliance 602, 604, 606, 608 has access to digital data transmitted between each watched network 612, 614, 616, 618, and the Internet 620. While a network appliance utilized with a CPS generally may operate either in-stream or mirrored along a network segment, the configuration illustrated in FIG. 8 illustrates network appliances 602, 604, 606, 608 configured to receive mirrored data transmitted between watched networks 612, 614, 616, 618 and the Internet 620. Each network appliance is capable of communicating with a CPS network data center 630, which preferably includes such devices as a transaction request broker service 632, a transaction recording and management service 634, a transaction database 636, a raw media storage service 644, and a raw media storage archive 646. The transaction request broker 632 preferably routes and/or manages transactions between various components of the CPS, including various network appliances 602, 604, 606, 608. The transaction database 636 stores information relating to transactions in digital works, with particular emphasis on unauthorized transactions in registered copyrighted works. The transaction recording and management service 634 provides an interface with the transaction database 636. The raw media storage archive 646 may be used to store information including digital works, such as those supplied by copyright owners or duplicated from traffic communicated between a watched network 612, 614, 616, 618 and the Internet 620. The raw media storage archive 646 may further store fingerprints generated from copyrighted works. The raw media storage service 644 provides an interface with the raw media storage archive 646.

Each network appliance 602, 614, 606, 608 preferably includes a memory for receiving and storing content-based identifiers, including fingerprints. Preferably, each network appliance 602, 614, 606, 608 includes a processor to provide content type identification and content assessment capabilities. Each network appliance 602, 614, 606, 608 may be periodically updated with new identifiers from the network data center 630, such as identifiers for newly registered copyrighted works. The distributed architecture of a CPS according to FIG. 8 facilitates rapid monitoring of high-bandwidth watched networks 612, 614, 616, 618. Each network appliance 602, 604, 606, 608 may communicate with the network data center 630 by way of a public network such as the Internet, a virtual private network, a dedicated private network, or any combination of such connection types to promote system reliability in case one becomes inoperable. Additionally, while FIG. 8 illustrates only a single network appliance at each watched network 612, 614, 616, 618, redundant network appliances may be provided at each location to enhance overall system reliability.

Figure 9:
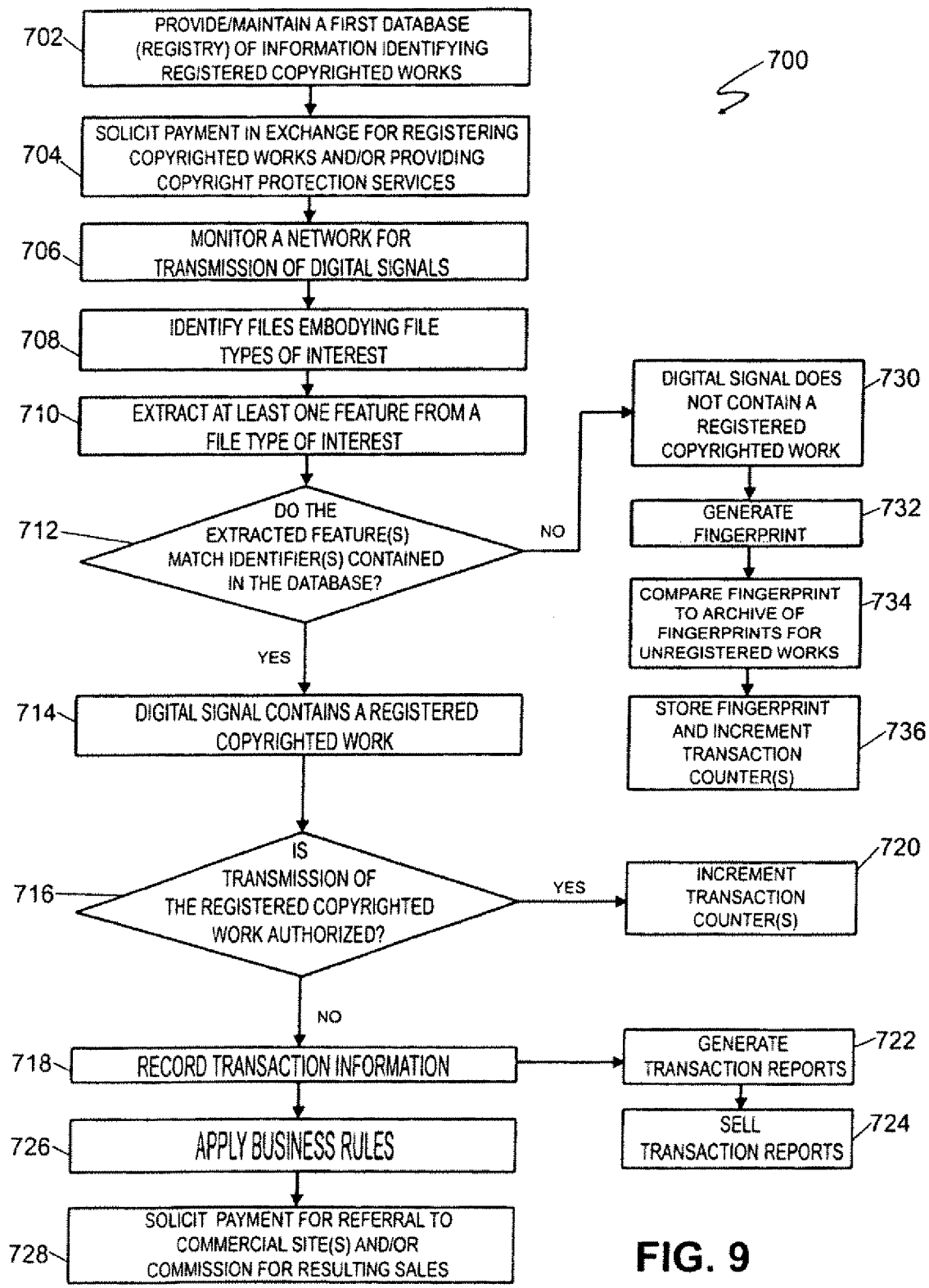
FIG. 9 is a process flow diagram for a method of conducting a business enterprise through the provision of copyright protection services or a copyright protection system.

Propagation and utilization of a CPS 100, 200, 300, 600 as disclosed herein enables novel methods of conducting a profitable business enterprise. FIG. 9 illustrates a business method 700 including steps that may be employed according to one or more CPS embodiments. The business method 700 illustrated in FIG. 9 is intended to present merely one example of novel business steps; non-obvious variants omitting certain steps, addition of further steps, and applying disclosed steps in a modified sequence are still contemplated to remain within the scope of the invention.

The first step 702 provided in FIG. 9 is providing and/or maintaining a database (or "registry") of information identifying registered copyrighted works. Herein after a digital work which has been added to the database will be referred to as a "registered work" or "registered copyrighted work". As new original works are being continuously created and owners of existing copyrighted works or operator of the CPS may elect to protect works by way of a CPS as disclosed herein, a database of identifiers should be designed to grow over time. A data enrichment method, such as that as discussed in conjunction with FIG. 7, is preferably applied to build and maintain the database according to this step 702. A revenue generating step 704 includes the solicitation of payment in exchange for registering copyrighted works and/or providing copyright infringement protection services. This payment may be solicited by the provider from, for example, copyright owners individually, associations of copyright owners, network providers or operators, or any combination thereof.

Providing copyright protection services according to the present invention generally includes monitoring a network or network segment for transmission of digital signals, as in step 706. Identification of files embodying file types of interest transmitted over the monitored network or network segment may be performed according to step 708. If a file type of interest is found, then one or many of various features may be extracted or generated from the file to facilitate content identification according to step 710. A comparison step 712 is advantageously performed to determine whether the extracted or generated features match one or more identifiers contained in the database maintained according to step 702. If a match is made, then such a match indicates that the file from which the features were obtained contains a registered copyrighted work, as noted in step 714.

A typical follow-up step 716 is to check whether transmission or receipt of the registered copyrighted work has been authorized by the copyright owner. Preferably, the CPS provider maintains a database that identifies authorized senders and/or receivers of digital copyrighted works, and that further includes preferences of the copyright owner for handling transactions in a copyrighted work. Determining whether a particular address is authorized to transmit and/or receive a registered copyrighted work may be performed by querying the database for such information. Regarding handling preferences, such preferences may be used by the CPS provider to apply business rules to transactions or attempted transactions in registered copyrighted works. For example, some copyright owners such as software developers may distribute copyrighted material according to license agreements that expressly forbid digital transmission of the source code. Such owners might prefer to block all attempted digital transmission of these materials, and communicate this preference to the CPS provider.

If upon application of step 716 it is determined that the transmission is not authorized, then information identifying the transaction may be recorded (such as in the transaction database illustrated in FIG. 8) according to step 718. Recorded information for an unauthorized transaction may include identifiers such as included in FIG. 2. Preferably, transaction reports, such as the report illustrated in FIG. 2, may be generated from some or all of the recorded information. As information contained in transaction reports may be valuable to copyright owners and others, for purposes including but not limited to marketing and seeking licensing revenue, such reports may be sold by the CPS provider in a further revenue generating step 724.

The ability of generating transaction reports and/or blocking content provides additional revenue generation potential by affording businesses and organizations the opportunity to install the CPS on their networks or computers. A per-seat license may be offered to an organization or business to limit and/or monitor the transmission of content by its members and thereby limit the organization's or business' exposure to liability for unauthorized use of content. Similar to the way virus protection software may be installed on individual computers in a local area network of an organization, CPS client software may be installed to afford an organization or business copyright infringement protection.

If transmission of the registered copyrighted work is authorized, then preferably lesser information regarding the transaction may be recorded, such as by incrementing a counter of transactions in the particular registered work, according to step 720. Preferably less information is recorded in the case of an authorized, lawful transaction to respect the privacy rights of the sender and receiver.

Following recordation of transaction information for an unauthorized transaction according to step 718, business rules may be applied to the transaction according to step 726. As mentioned above, the CPS provider preferably solicits preferences of copyright owners for handling unauthorized transactions in registered copyrighted works, and the CPS provider maintains a database recording those preferences. The preferences are preferably established at the time a work is registered with the CPS, so that business rules to be applied to a particular copyrighted work may be defined before detection by the CPS provider of an unauthorized transaction in a registered copyrighted work. As noted previously, business rules that might be applied include but are not limited to blocking unauthorized transmissions, sending a message to the source address and/or recipient address, referring the source address and/or recipient address to a commercial website, and/or recording transactions in copyrighted works carried by the monitored signal. A further revenue-generating step 728 may follow from the application of business rules, as the CPS provider may solicit payment for referrals to commercial sites, such as websites, where copyrighted works are available for sale and/or commissions for sales resulting from such referrals. Preferably, the CPS provider obtains an affiliation, such as by contract, with commercial sites to provide for referral and/or commission payments. Accordingly, the exemplary business method 700 provided in FIG. 9 provides multiple potential revenue streams to the CPS provider.

Returning to the comparison step 712 wherein the features obtained from a sampled work were compared to identifiers contained in a CPS database, if no match is found, then it may be concluded that the digital sample does not correspond to a registered copyrighted work, as provided in step 730. Yet it may still be useful to record information relating to this work, to facilitate retroactive reporting in case a copyright owner later registers the work with the CPS provider and seeks information relating to its digital distribution. A fingerprint may be generated from the unregistered work according to step 732. Thereafter, the fingerprint may be stored by the CPS provider in a database or archive such as the database 646 provided in FIG. 8. Preferably, the database (such as database 646 of FIG. 8) is queried to compare the newly generated fingerprint to archived fingerprints for other unregistered works according to step 734. If a match is found from this query, then a transaction counter may be incremented to reflect the number of transactions in the particular work according to step 736. If no match is found, then the fingerprint is preferably added to the database of unregistered works. Regarding the capability of providing retroactive transaction reports, such information may be useful to the copyright owner in selecting particular preferences or business rules to be applied by the CPS provider to protect a copyrighted work following its registration.

As noted previously, U.S. Pat. No. 5,918,223 provides a method for performing analysis and comparison of audio data files based upon the content of the data files. An alternative method to that disclosed in U.S. Pat. No. 5,918,223 for generating statistical models of digital audio recordings, which are used for probabilistic identification of unknown digital audio streams, is referred to herein as a Stochastic Audio Matching Mechanism (SAMM). If utilized, SAMM is preferably embodied in a software routine that may operated on a device such as a network appliance (e.g., network appliance 104 in FIG. 1, network appliance 204 in FIG. 4, or network appliances 602-608 illustrated in FIG. 8). Discussed below are the mathematical and statistical concepts behind the SAMM system, as well as a description of one implementation of these concepts.

SAMM is a process for generating statistical models of digital audio recordings and using these models for probabilistic identification of unknown digital audio streams. The creation of the models and the identification of unknown audio streams are separate functional processes, but they are logically tied together within the overall goal of audio identification. In practice, the use of SAMM involves the generation of many models for each audio item that is to be identified, and the storage of these models in a SAMM database. Once the database has been constructed, unknown digital audio streams can be positively or negatively (no match found) identified within a known degree of accuracy using the SAMM database of audio models. SAMM encompasses two distinct functional processes of model generation and audio identification.

It is important to reiterate that the SAMM process is a statistical tool, and that the identification of unknown audio streams is based on the probability that features the unknown audio exhibits matches the features from a known audio sample. A probability over a given threshold likely indicates that the unknown audio stream matches (corresponds) to the current known sample being compared against, while a probability under the given threshold indicates that the unknown audio stream does not match the current model being compared against. Since the system is probabilistic against a threshold, there are no absolutes when using this process.

The model generation process and the audio identification process share a common set of data that they operate upon. These data are the features of the digital audio stream. A single feature is a collection of the representative characteristics of the audio stream at a single point in time (currently, about twenty characteristics per feature). Many features are extracted for a given audio stream, usually one hundred per second. Once the collection of the feature set is completed, SAMM can then generate a model for storage, or use the feature set to compare against known models. The details pertaining to feature extraction, model creation and audio matching are explained fully in the Process Detail section.

A. SAMM Overview

Figure 10:
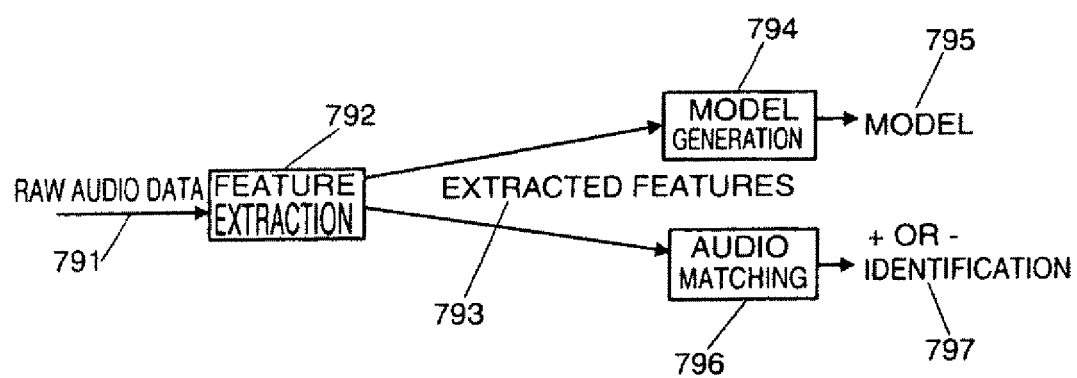
FIG. 10 is a generalized data flow diagram for use with a Stochastic Audio Matching Mechanism.
Figure 11:
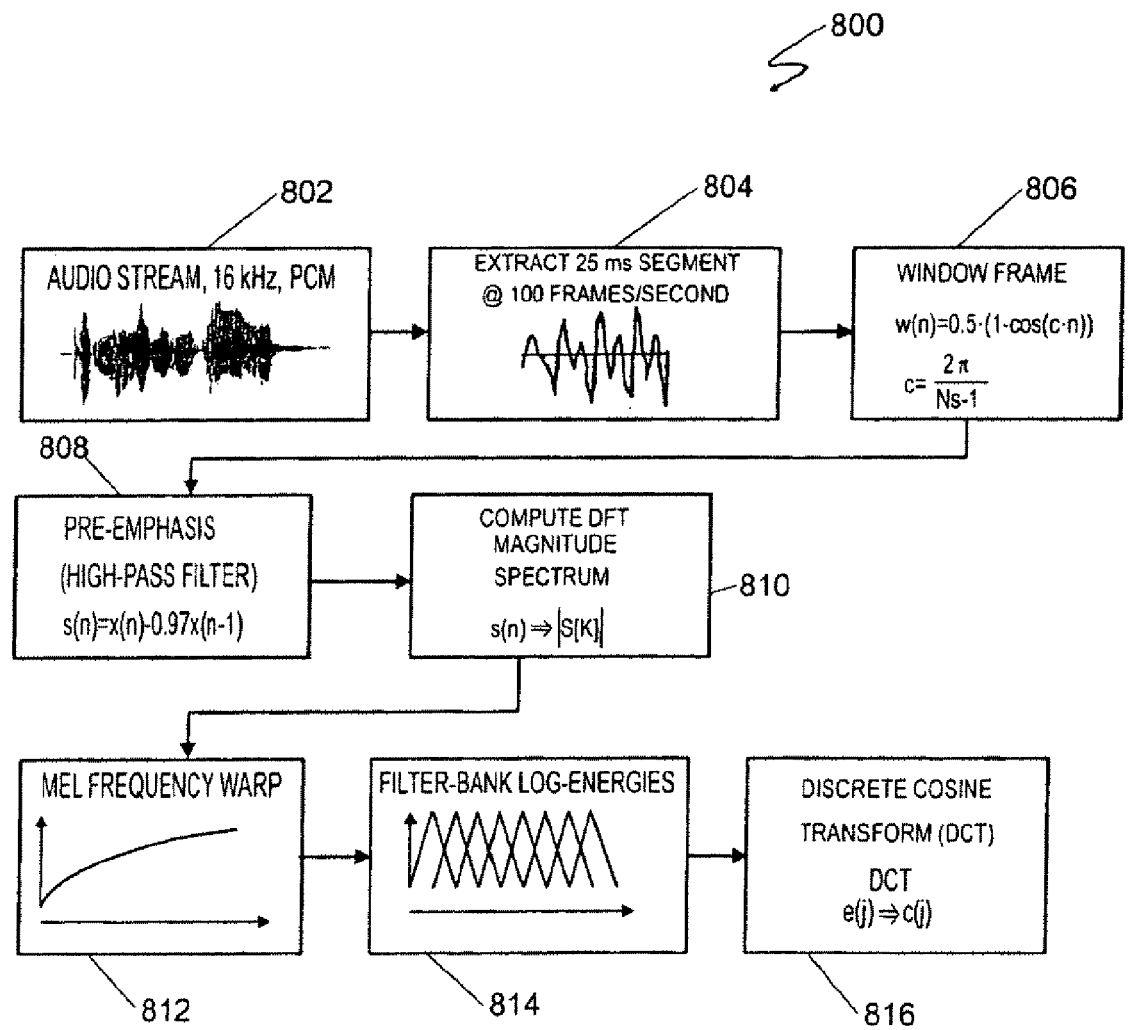
FIG. 11 is a process flow diagram for extracting feature vectors comprising Mel Frequency Cepstral Coefficients.

FIG. 10 provides a generalized description of the data flow within SAMM. Boxes 792, 794, 796 represent the major processes of Feature Extraction, Model Generation, and Audio Matching, as will be described herein in further detail. The plain text in FIG. 10 represents the input and outputs for each process. Raw audio input 791 is provided to the feature extraction process 792, which outputs extracted features 793 to both the model generation and audio matching processes 794, 796. The model generation process results in creation of a model 795, while the audio matching process results in either positive or negative identification 797.

B. SAMM Inputs and Outputs

1. Feature Extraction a. Data Input

Regardless of the desired SAMM functionality (i.e., model generation or audio stream identification), at least one feature, and preferably a collection of features, is generated from an initial digital audio stream, such as the raw audio data 791 illustrated in FIG. 10. This audio stream is therefore the initial data input for the system as a whole. Raw digital audio 791 coming into the system is preferably first decoded and down-sampled to a pulse code modulation (PCM) stream, such as at a frequency of 16 kHz. Typically, .mp3 and CD quality audio streams are encoded at 44.1 kHz. This decompression and conversion may be performed by a readily available third party utility such as the Linux utility mpg123. Once decompressed and converted, the PCM stream is assembled into a data array, which is the primary input into the Feature Extraction process 792.

b. Parametric Input

The statistical parameters used in feature extraction should be determined before the extraction process 792 occurs. The primary parameters used in the mathematical and statistical formulas used for feature extraction (discussed in further detail, infra) are summarized below with corresponding sample values for illustration purposes:

Sampling rate of the incoming PCM data (e.g., 16 kHz).
Window length (which is a function of the sample rate).
Skip rate (which is a function of the sample rate).
Pre-emphasize constant (e.g., 0.97).
a Filter bank count (e.g., 20)—this is the number of datum in a feature.
Filter bank channels (e.g., Filter bank count−1)—number of computed Mel-Frequency Cepstral Coefficient (MFCC).
Center frequency (e.g., Filter bank count+2).
These parameters are preferably set or calculated software.

c. Feature Output

The output of the Feature Extraction process 792 is a collection of feature vectors, the number of which is determined by the parametric input to the process. Each vector preferably consists of Filter bank count number of floats and this vector statistically represents the digital audio stream at a particular moment in time. The collection of features is treated within the software as an array of arrays (two-dimensional array) of floats, and this serves as the data input to the 2. Model Generation process 794 and 3. Model Matching process 796.

2. Model Generation a. Data Input

The input to the Model Generation process 794 is an array of an array of floats (collection of feature vectors 793) representing the audio to be modeled. This is the output of the 1. Feature Extraction process 792.

b. Parametric Input

The statistical parameters used in the extraction of features should be determined before execution of the Feature Extraction process 792. The primary parameters chosen for the mathematical and statistic formulas used in model generation are summarized below with corresponding sample values for illustration purposes:

Vector length (e.g., Filter bank count).
Mixture count (e.g., 8).
Max iterations (e.g., 15).
Max frames (erg., 3000—this corresponds to 100 frames per second for 30 seconds of audio).
Variance threshold (e.g., 0.001).
These parameters are preferably set or calculated within software.

c. Model Output

A generated model 795 is preferably a binary file containing statistical information about the raw audio 791 from which the original feature set was generated. The output model 795 is preferably stored in a "SAMM" database (such as, for example, the database 338 illustrated in FIG. 5 or the database 646 illustrated in FIG. 8) for use in a model matching process 796.

3. Model Matching a. Data Input

The input to the model matching process 796 is preferably an array of an array of floats (collection of feature vectors 793) representing the audio to be identified. This is the output of the 1. Feature Extraction process 792.

b. Model Matching Result

Output from the model matching process 796 is preferably a textual representation of the identification result. If the feature set from a digital audio stream did not have a match against any model in a SAMM database, a "NO_MATCH" string may be returned. If the statistical attributes of the digital audio stream compare favorably against a model in a SAMM database, then the string "sMATCH—<ID>" may be returned, where "<ID>" may be replaced by a unique SAMM database identification number of the model that the input matched with a degree of certainty.

C. Process Detail

1. Feature Extraction a. Concept Overview

The primary goal of the feature extraction process 792 is to develop a representation of the acoustic signal suitable for classification. A good set of features for this problem should take into account the properties of the human ear while maintaining a high rate of data compression. Because the ear is most sensitive to changes in spectral magnitude and least sensitive to signal phase difference, the features used here preferably capture the spectral shape of the signal over small "snap-shots" in time. In particular, the audio may be analyzed over small blocks of samples during which the signal is assumed to be short-time stationary (20 to 25 ms is reasonable for speech and most audio). Overlapping windowed segments of audio may be extracted at a rate of, for example, 100 snap-shots per second to produce a vectored feature stream for classification. Different extraction rates may be used. Each frame of audio consisting of approximately 25 ms of PCM samples (e.g., 400 samples @ 16 kHz) may be converted into a multi-dimensional, preferably 20-dimensional, vector that encodes the spectral shape and relative-energy of the signal. The feature vector used in the audio classifier is described in further detail below.

b. Mathematics/Statistics

Observation vectors are computed periodically, preferably every 10 ms, from short-time windowed segments of audio data, preferably 25 ms in length. For each frame of audio, a multi-dimensional, preferably 20-dimensional, observation vector is extracted consisting of multiple Mel Frequency Cepstral Coefficients (MFCC), preferably 19 in number, and one normalized log-energy term. A block diagram of a MFCC feature extraction process 800 is illustrated in FIG. 1. In a first step 802, raw digital audio is decoded and down-sampled to a PCM stream, such as at a 16 kHz frequency. In a second step 804, short-time windowed segments are extracted from the down-sampled stream. According to a third step 806, a sampled frame is windowed. The feature extraction begins by pre-emphasizing the audio to remove glottal and lip radiation effects according to a fourth step 808. The pre-emphasis operation is implemented as a first order Finite Impulse Response (FIR) filter given by $$H(z) = 1 - 0.97 z^{-1} \quad \text{(Eqn. 1)}$$

where z represents a one sample delay. Note that in the time-domain, the resulting signal is given by $y(n)=s(n)-0.97s(n-1)$ where $y(n)$ represents the pre-emphasized signal and $s(n)$ represents the input signal. Next, the magnitude spectrum of the waveform is computed using the Discrete Fourier Transform (DFT) according to step 810. The linear frequency axis is then warped onto the Mel scale according to step 812 in order to take into account the relationship between frequency and "perceived" pitch. The mapping between the linear frequency scale and Mel scale is given by $$f_{mel} = 2595 \log_{10}\left(1 + \frac{f_{linear}}{700}\right) \quad \text{(Eqn. 2)}$$

The warped magnitude spectrum is next passed through a bank of triangular-shaped filters that uniformly partition the Mel frequency scale into P regions according to step 814. Note that uniformity on the Mel frequency scale takes into account nonlinear sensitivity of the ear across frequency. For 16 kHz sampled audio, 20 filters (P=20) are used. The filter outputs generate a discrete set of P log-energy terms, (e[j], j=1 ... P). Let $w_j[k]$ represent the weight of the jth filter to the kth discrete frequency of the sampled signal s(n) and let $|S_{mel}[k]|$ represent the DFT magnitude spectrum of s(n) warped onto the Mel frequency scale. Assuming an N point DFT of the signal, the log-energy within the jth filter bank is given by, $$e[j] = \log_2\left(\sum_{k=0}^{N-1} w_j[k]|S_{mel}[k]|\right) \text{ for } j = 1, 2, \ldots P \qquad \text{(Eqn. 3)}$$

Thereafter, the 19 MFCCs ($c_t[i]$, i=1 ... 19) are computed for each excised frame of audio by decorrelating the filter outputs according to step 816 using the discrete cosine transform (DCT), $$\tilde{c}_t[i] = \sqrt{\frac{2}{P}} \sum_{j=1}^{P} \left(e[j] \cdot \cos\left(\frac{\pi i}{P}(j - 0.5)\right)\right) \qquad \text{(Eqn. 4)}$$

Finally removing the long-term mean from the features normalizes the MFCC parameters. This process, known as Cepstral Mean Normalization, helps to reduce the influence of channel mismatch on the excised features (e.g., in song classification such mismatch can occur when different codecs are used to encode the signal or if frequency equalization is applied during the encoding process). The final 19 MFCCs are given by $$c_t[i] = \frac{1}{T}\sum_{t=1}^{T} \tilde{c}_t[i] \qquad \text{(Eqn. 5)}$$

The 19 dimensional vector is augmented with a normalized log-energy component, which is calculated for each frame of data. Finally, the log-energy term is calculated by first taking the log of the sum of the squared data samples. Let $s_t(n)$ represent the nth sample from the nth excised frame of audio. Assuming Ns samples per frame of audio, an initial frame-based energy term is computed as follows, $$\tilde{e}_t = \log_2\left(\sum_{n=1}^{Ns} s_t^2(n)\right) \qquad \text{(Eqn. 6)}$$

The energy outputs are normalized to range between –5.0 and +1.0 and are augmented as the $20^{th}$ feature vector element.

c. Feature Extraction Implementation

Figure 12A:
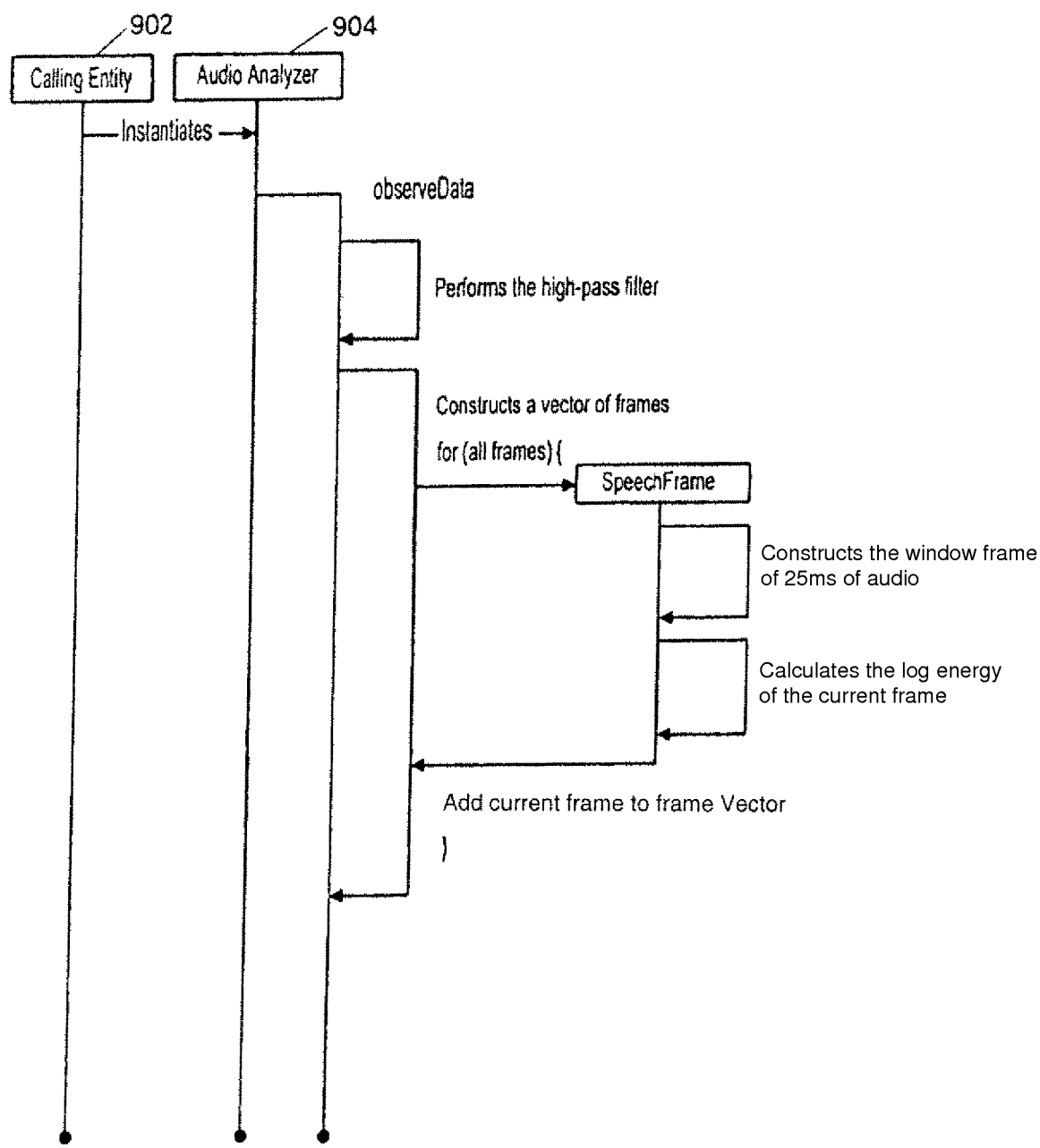
FIG. 12a is a first portion of an annotated sequence diagram for extracting features from a digital audio work according to a Stochastic Audio Matching Mechanism.
Figure 12B:
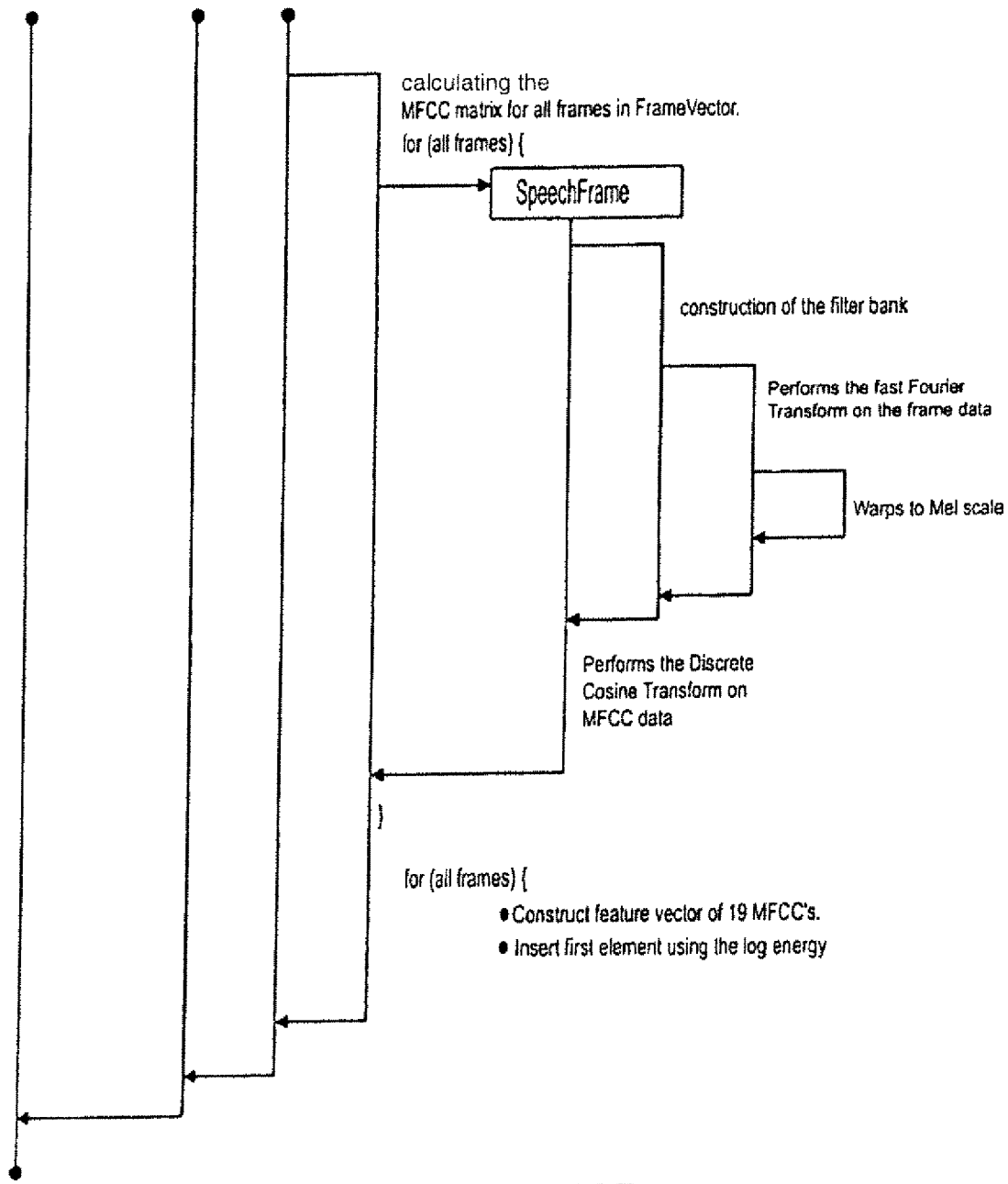

The implementation discussions herein are intended is to provide a high-level mapping of the concepts and the mathematics for providing SAMM functionality sufficient to enable one skilled in the art to practice the inventive method. In furtherance of this goal, FIGS. 12a-12b provide annotated sequence diagrams to additionally detail the program and data flow of the individual processes. The following sections are intended to discuss the inner workings of SAMM in the context of the concepts and mathematics at the object level.

The implementation of SAMM is preferably performed in an object-oriented fashion, such as in the C++ programming language, thus all objects described in this section and in the following sections are C++ objects.

A higher level calling entity 902 within the Media Analysis System initiates the process of feature extraction. A utility object within SAMM called the AudioAnalyzer 904, which is instantiated and managed by the calling entity, performs the actual extraction. The calling entity 902 is also responsible for managing the collection of raw data from which features are extracted, and managing the AudioAnalyzer's use of this data. The calling entity executes various member functions on the AudioAnalyzer 904 with the ultimate goal being the extraction of features from raw audio data and the storage of this collection of features as a data member within the AudioAnalyzer object 904. Once populated with the features, the AudioAnalyzer object 904 is used as the storage and wrapper of the features as they are used in the process of model generation of audio identification.

2. Media Model Generation a. Concept Overview

Figure 13A:
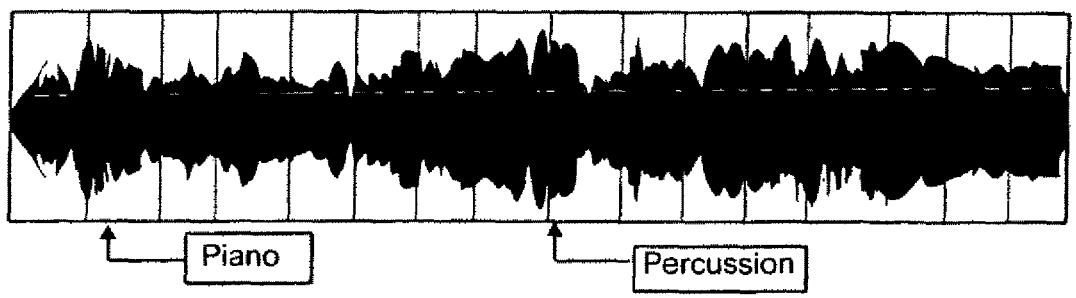
FIG. 13a is a graph plotting frequency versus time for a first musical piece performed by a first artist.
Figure 13B:
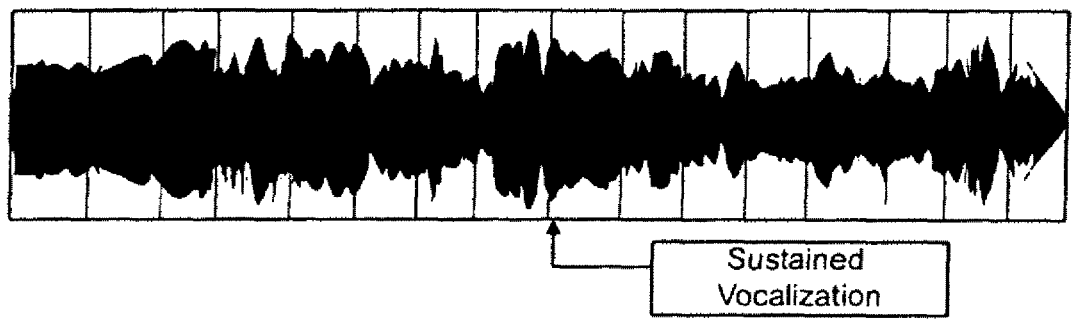
FIG. 13b is a graph plotting frequency versus time for a second musical piece performed by a second artist.

It is assumed that perceptual difference between audio music and other audio media are primarily manifested by the characteristics of the signal's spectrum. This is illustrated in FIGS. 13a-13b for two segments of audio from music pieces. Here, frequency is plotted along the y-axis while time is plotted along the x-axis. In FIG. 13a we see distinct sequences of spectral patterns emerge as the song progresses from piano key strokes through a percussion hit through finally a sequence of synthesizer key strokes. In FIG. 13b we see other patterns manifested when a singer vocalizes a word in the song. In FIG. 13a a piano keystroke leads into a percussion followed by synthesizer notes. In FIG. 13b an artist sustains vocalization while singing. It is assumed that the sequences of spectral patterns across the time-sequence of the audio represent the signature or "footprint" of the song. Modeling the spectral characteristics of each audio clip allows one to distinguish between artists and music pieces.

Ideally, one would prefer to model the trajectory of the spectral events in order to capture the evolution of the audio over time. However, it is pointed out that the explicit modeling of temporal events leads to a classification algorithm which is susceptible to performance degradations when the signal is shifted in time.

The proposed algorithm considered here assumes that the sequence of features extracted from the song is statistically independent. Under this assumption, the likelihood of observing a feature vector $\bar{x}_t$, at time t is not dependent on the feature vector $\bar{x}_{t-1}$ extracted at time t–1 or any other time for that matter. In other words, the likelihood of observing sequence of T feature vectors, $X=\{\bar{x}_1, \bar{x}_2, \ldots, \bar{x}_T\}$ given a model λ for an audio segment can be expressed as, $$p(X|\lambda) = \prod_{t=1}^{T} p(\vec{x}_t|\lambda) \qquad \text{(Eqn. 7)}$$

Eqn. 7 states that the likelihood of observing a sequence of feature vectors given a particular model for a music clip is based on the product of the individual likelihood of observing each feature vector excised from the clip. At 100 feature vectors per second of audio, complete computation of Eqn. 7 for 30 seconds of a song would require the product of T=3000 individual likelihoods. Note that since repeated multiplication of many numbers smaller than 1 leads to numerical underflow problems on most PC hardware. Therefore, the likelihood in Eqn. 7 is generally expressed in terms of its log-likelihood, $$\log p(X | \lambda) = \sum_{t=1}^{T} \log p(\vec{x}_t | \lambda) \qquad \text{(Eqn. 8)}$$

The basic concept behind the audio modeling scheme is that each song under consideration can be modeled by characterizing the statistical distribution of the feature vectors excised from an example of the song. In doing so, the audio modeling scheme becomes less sensitive to slight alterations in the features. Such alterations can be experienced due to differences in audio codecs, time-shifts in the signal, sampling rate, etc. Unlike audio "fingerprinting" schemes that try to find an exact match of the audio to a known model, the statistical approach returns the likelihood or probability that the observed set of features were generated by a model, $\lambda$. Therefore given a set of S modeled songs, $\{\lambda_1, \lambda_2, \ldots \lambda_s\}$, and an unknown audio clip with excised feature sequence, X={$\bar{x}_1$, $\bar{x}_2, \ldots, \bar{x}_T$}, the goal of the search is to find the model $\lambda_s$ with the maximum likelihood of generating the unknown feature sequence. The song associated with this model is assumed to best match the unknown. In other words, $$\lambda_s = \arg\max_{1 \leq s \leq S} \{\log p(X | \lambda_s)\} \qquad \text{(Eqn. 9)}$$

Of course, Eqn. 9 assumes that the feature sequence X={$\bar{x}_1, \bar{x}_2, \ldots, \bar{x}_T$} was generated from at least one of the known S songs in the database. A case in which the test sequence is outside of a known database will be considered, infra.

b. Mathematics/Statistics

It is assumed that the feature vector sequence X={$\bar{x}_1, \bar{x}_2, \ldots, \bar{x}_T$} is statistically independent and generated from a random process consisting of a linear combination of Gaussian basis functions. Models of this type are known as Gaussian Mixture Models (GMMs). GMMs have been used in the past for problems such as Speaker Identification and Language Identification. A Gaussian Mixture Model characterizes the likelihood of observing a feature vector $\bar{x}$ as a weighted combination of Gaussians:

i. The Gaussian Mixture Model $$p(\vec{x} | \lambda) = \sum_{m=1}^{M} w_m \cdot b_m(\vec{x}) \qquad \text{(Eqn. 10)}$$

where $b_m(\bar{x})$ is the multivariate Gaussian density. For a D-dimensional feature vector, $b_m(\bar{x})$ can be expressed as, $$b_m(\vec{x}) = \frac{1}{(2\pi)^{D/2} |\Sigma_m|^{1/2}} \exp\left\{-\frac{1}{2}(\vec{x} - \vec{\mu}_m) \Sigma_m^{-1} (\vec{x} - \vec{\mu}_m)\right\} \qquad \text{(Eqn. 11)}$$

Here, $\bar{\mu}_m$ and $\Sigma_m$ represents the vector mean and covariance of the mth Gaussian density respectively. Further, the weights for the Gaussian functions follow the sum-to-one property, $$\sum_{m=1}^{M} w_m = 1 \qquad \text{(Eqn. 12)}$$

For data sparsity and speed issues, the covariance matrix in the model is assumed to be diagonal, i.e., all elements off the diagonal are zero-valued. Therefore, our model consists of M mixture weights, mean vectors, and covariance matrices. Typically numbers of mixtures needed to accurately model a song range between M=10 and M=32.

ii. Parameter Estimation

Estimation of the model parameters is based on the Expectation-Maximization (EM) algorithm A. Dempster, N. Laird, and D. Rubin, "Maximum Likelihood from Incomplete Data Via the EM Algorithm," *J. Royal Stat. Soc.*, Vol. 39, pp. 1-38, 1977, and L. Baum et al., "A Maximization Technique Occurring in the Statistical Analysis of Probabilistic Functions of Markov Chains," Ann. Math. Stat., Vol. 41, pp. 164-171, 1970, both references of which are incorporated by reference as though fully set forth herein. A practical application of the update equations can be found in D. Reynolds, R. Rose, "Robust Text Independent Speaker Identification Using Gaussian Mixture Speaker Models," *IEEE Transactions on Speech and Audio Processing*, Vol. 3, No. 1, pp. 72-83, January 1995, which is incorporated by reference as though fully set forth herein. The parameter estimation algorithm is iterative. At each iteration, a new set of model parameters are determined which increase the total likelihood of the training patterns against the current model. In general between 6-10 iterations of the parameter update equations are required before model convergence.

(1) Initialization: The M mean vectors of the model are initialize to randomly chosen data vectors in the training set of T vectors, X={$\bar{x}_1, \bar{x}_2, \ldots, \bar{x}_T$}. The M covariance vectors are initialized to have unit variance for each feature element and mixture weights are initialized to have equal weighting (i.e. $w_m$=1/M).

(2) Iterative Update: Assuming diagonal covariance matrices, the observation probability, $b_m(\bar{x}_t)$, can be expressed by, $$b_m(\vec{x}_t) = \sum_{m=1}^{M} \frac{w_m}{(2\pi)^{D/2} \sqrt{\prod_{j=1}^{D} \sigma_m^2[j]}} \exp\left\{-\frac{1}{2} \sum_{j=1}^{D} \frac{(x_t[j] - \mu_m[j])^2}{\sigma_m^2[j]}\right\} \qquad \text{(Eqn. 13)}$$

(3) Likelihood: Let $p(m|\bar{x}_t,\lambda)$ represent the a posteriori probability of the mth modeled Gaussian given feature vector $\bar{x}_t$, $$p(m | \vec{x}_t, \lambda) = \frac{w_m \cdot b_m(\vec{x}_t)}{\sum_{k=1}^{M} w_k b_k(\vec{x}_t)} \qquad \text{(Eqn. 14)}$$

The update equations for the mixture weights, mean vectors, and diagonal-covariance matrices can then be expressed as, Mixture weight update $$\bar{w}_m = \frac{1}{T}\sum_{t=1}^{T} p(m|\vec{x}_t, \lambda) \quad \text{(Eqn. 15)}$$

Mean vector update $$\vec{\bar{\mu}}_m = \frac{\sum_{t=1}^{T} p(m|\vec{x}_t, \lambda)\cdot\vec{x}_t}{\sum_{t=1}^{T} p(m|\vec{x}_t, \lambda)} \quad \text{(Eqn. 16)}$$

Diagonal-Covariance update $$\bar{\sigma}_m^2 = \frac{\sum_{t=1}^{T} p(m|\vec{x}_t, \lambda)\cdot\vec{x}_t^2}{\sum_{t=1}^{T} p(m|\vec{x}_t, \lambda)} - \vec{\bar{\mu}}_m^2 \quad \text{(Eqn. 17)}$$

(4) Check Likelihood: The total likelihood (Eqn. 7) of the data iteration i should be greater than that at iteration i−1. Note that over-iterating can reduce the performance of the classifier.

iii. Practical Considerations

There are several practical ranges for the parameters that can be observed during model estimation in order to determine whether or not the convergence criteria for the iterative EM algorithm are satisfied. While absolute criterion that total likelihood of the data against model should increase at each iteration, the following parameter ranges should be maintained, $$0 \le \bar{w}_m \le 1$$

$$\bar{\sigma}_m^2 > 0$$

$$0 \le b_m(\vec{x}_t) \le 1$$

iv. Notes on Algorithmic Efficiency for Likelihood Calculations

Computation of the likelihood of an individual feature vector against a known model is generally expressed in the log-domain to avoid numerical underflow problems, $$\log p(\vec{x}|\lambda) = \log\left\{\sum_{m=1}^{M} w_m \cdot b_m(\vec{x})\right\} \quad \text{(Eqn. 18)}$$

As mentioned, we can expand Eqn. 18 by inserting Eqn. 13 for $b_m(\vec{x}_t)$:

$$\log p(\vec{x}|\lambda) = \quad \text{(Eqn. 19)}$$

$$\log\left\{\sum_{m=1}^{M} \frac{w_m}{(2\pi)^{D/2}|\Sigma_m|^{1/2}} \exp\left\{-\frac{1}{2}(\vec{x}-\vec{\mu}_m)\Sigma_m^{-1}(\vec{x}-\vec{\mu}_m)\right\}\right\}$$

Assuming diagonal covariance matrices, Eqn. 19 becomes, $$\log p(\vec{x}|\lambda) = \log \quad \text{(Eqn. 20)}$$

$$\left\{\sum_{m=1}^{M} \frac{w_m}{(2\pi)^{D/2}\sqrt{\prod_{j=1}^{D}\sigma_m^2[j]}} \exp\left\{-\frac{1}{2}\sum_{j=1}^{D}\frac{(x_t[j]-\mu_m[j])^2}{\sigma_m^2[j]}\right\}\right\}$$

Evaluation of Eqn. 20 requires M exp operations, 3D+M multiplies, and one log operation. In general, we observe that one Gaussian tends to dominate the likelihood computation. Therefore, if it is assumed that only one Gaussian contributes significantly and the remaining M−1 Gaussians have zero-probability, it can be shown that the expression in Eqn. 20 can be approximate as follows, $$\log p(\vec{x}|\lambda) = \underset{1 \le m \le M}{\arg\max}\left\{C_m - \frac{1}{2}\sum_{j=1}^{D}\frac{(x_t[j]-\mu_m[j])^2}{\sigma_m^2[j]}\right\} \quad \text{(Eqn. 21)}$$

Here $C_m$ is a mixture-density dependent constant that can be pre-computed at run-time, $$C_m = \log(w_m) - \frac{D}{2}\log(2\pi) - \frac{1}{2}\sum_{j=1}^{D}\log(\sigma_m^2[j]) \quad \text{(Eqn. 22)}$$

Further computational savings for Eqn. 21 can be obtained using partial distance elimination (PDE) and feature component reordering (FCR) as described in B. Pellom, R. Sarikaya, J. Hansen, "Fast Likelihood Computation Techniques in Nearest-Neighbor based search for Continuous Speech Recognition," submitted to IEEE Signal Processing Letters. The basic idea of partial distance elimination is to compute Eqn. 21 for the first mixture Gaussian (m=1) in its entirety and only partially compute Eqn. 21 for the remaining mixtures. Note here that since Eqn. 21 seeks to determine the mixture component which maximizes the expression on the left-hand-side (LHS) of the equation, the summation over the D vector elements can be prematurely stopped as soon as the partial accumulation falls below that of the best-scoring mixture. The end result is that we compute the entire equation for at least one of the Gaussian basis functions but only partially compute the expression for some or all remaining mixtures The PDE algorithm is guaranteed to give the same output value as the complete computation of Eqn. 21 (i.e., if Eqn. 21 were to be computed as shown). Alone, PDE reduces the computation by 10% based on empirical simulations.

The effectiveness of the PDE algorithm can be enhanced when combined with feature component reordering (FCR). FCR seeks to re-order the sequence of features computed in the summation term in Eqn. 21 such that the partial summation more quickly approximates the true value of likelihood computed over all the elements. The re-ordering of the feature sequence (i.e., j ⇒ f(j)) is determined empirically from observed data. FCR combined with PDE reduces the computation of Eqn. 21 by 30% based on empirical simulations. Note that PDE and FCR both assume that the "nearest-neighbor" approximation for log-likelihood calculations is used.

C. Model Generation Implementation

Figure 14:
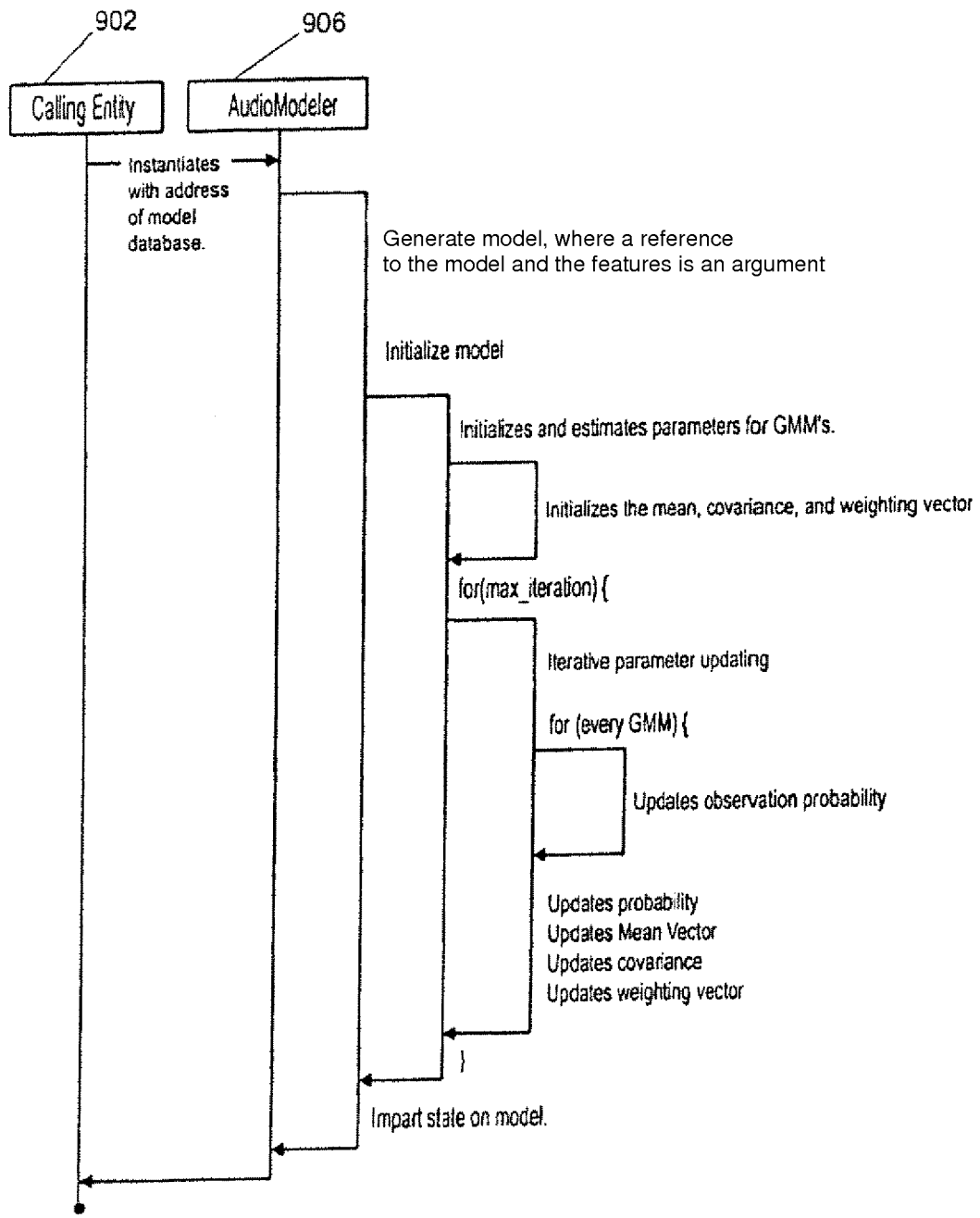
FIG. 14 is an annotated sequence diagram for generating a model from a digital audio work according to a Stochastic Audio Matching Mechanism.

FIG. 14 is an annotated sequence diagram describing the process of model generation within SAMM. A calling entity 902 initiates model creation via the use of the AudioModeler object 906. The inputs required for the AudioModeler object 906 are an AudioAnalyzer object 902, which contains the set of features to be modeled, and a reference to the model to be created. This reference is passed to the AudioModeler object 906, and the model is created in-situ.

3. Media Identification a. Concept Overview

The goal of the media identification algorithm is decide whether or not the audio material under test matches one of the S songs modeled by the system. If the system decides that the audio is from one of the modeled songs in the database, the identifier must provide a classification of which song the material is from.

b. Mathematics/Statistics

The media identification task can be cast as a binary hypothesis problem. Under hypothesis H1 we conclude that the audio under consideration was emitted from one of the known models $\lambda_s$ (s=1 . . . S). Under hypothesis H0, we conclude that the audio was not emitted from any of the known modeled songs. The optimal processor for the binary hypothesis problem is the likelihood-ratio test, $$\frac{p(X|\lambda_s)}{p(X|\lambda_{\bar{s}})} \overset{H1}{\underset{H0}{\gtreqless}} \Theta \quad \text{(Eqn. 23)}$$

In other words, we compare the ratio of probabilities that the feature sequence X was emitted from known model $\lambda_s$ against the probability that the feature sequence was emitted from an unknown source $\lambda_{\bar{s}}$ (i.e., a song not in the database). The resulting ratio is compared to a decision threshold $\Theta$. If the ratio falls below the threshold, we conclude hypothesis H0, otherwise we conclude hypothesis H1. In the log-domain, the log-likelihood ratio processor becomes, $$\underbrace{\log p(X|\lambda_s)}_{\text{obtained from song in finite database}} - \underbrace{\log p(X|\lambda_{\bar{s}})}_{\text{obtained from song outside of modeled database}} \overset{H1}{\underset{H0}{\gtreqless}} \log\Theta \quad \text{(Eqn. 24)}$$

It is clear that the first term on the LHS of Eqn. 24 can be expressed as a linear combination of Gaussian basis functions, estimated from the song under consideration for the test. However, the model $\lambda_{\bar{s}}$ that characterizes the H0 hypothesis is not so clearly defined. Currently, our solution is to model $\lambda_{\bar{s}}$ using the top N nearest models to X excluding $\lambda_s$. Eqn. 24 becomes, $$\underbrace{\log p(X|\lambda_{s=1})}_{\text{obtained from song in finite database}} - \frac{1}{N}\sum_{n=2}^{N+1} \underbrace{\log p(X|\lambda_{s=n})}_{\text{now obtained from songs inside of modeled database}} \overset{H1}{\underset{H0}{\gtreqless}} \log\Theta \quad \text{(Eqn. 25)}$$

Here, $\lambda_{s=1}$ is used to denote the model with the highest-likelihood for the unknown test observation sequence X and $\lambda_{s=n}$ (n=2 . . . N+1) is used to denote the next N top scoring models for same test observation sequence. The goal here is that the model for condition H0 should model the case of "any" song present while the first term in Eqn. 25 should model the case of a "particular" song we are interested in. In the next section, we consider the search mechanism. Note that the second normalization term in Eqn. 25 has been used for problems such as Speaker Voice Verification. This technique is sometimes referred to as "cohort normalization".

i. Search Algorithm

Given an unknown sequence of T excised feature vectors, $X=\{\bar{x}_1, \bar{x}_2, \ldots, \bar{x}_T\}$, and known modeled set of S song titles with associated GMMs $\{\lambda_1, \lambda_2, \ldots \lambda_S\}$ the search is defined as follows:

(1) Initialization: Initialize the accumulated log-likelihoods C[s] of all song models to zero. All songs are assumed to be active and potential candidates for X.

(2) Update: For each active song model, pickup one feature vector from the stream at time instant t and update the log-likelihood of each song model, $$C[s]=C[s]+\log p(\bar{x}_t|\lambda_s)$$

(3) Prune: After a sufficient block of features have been examined, prune a fraction of the remaining models that have the lowest log-likelihood score C[s]. If fewer than N+1 models remain, do not prune and models (since they are required to compute Eqn. 25).

(4) Repeat: Repeat steps 2 and 3 until N+1 models remain or all feature vectors in the stream have been consumed.

ii. Verification Algorithm

Utilizing the N+1 models with the largest log-likelihood, we hypothesize that the model with the absolute highest likelihood is the song representing the unknown feature sequence. We test this hypothesis using the likelihood ratio test (Eqn. 25). If the computed log-likelihood ratio falls below the threshold, we assume that the unknown is not a modeled song in our database. Otherwise, the best matching model (i.e., the one with the highest likelihood) is assumed to be the song that represents the unknown (our match).

c. Media Identification Implementation

Figure 15:
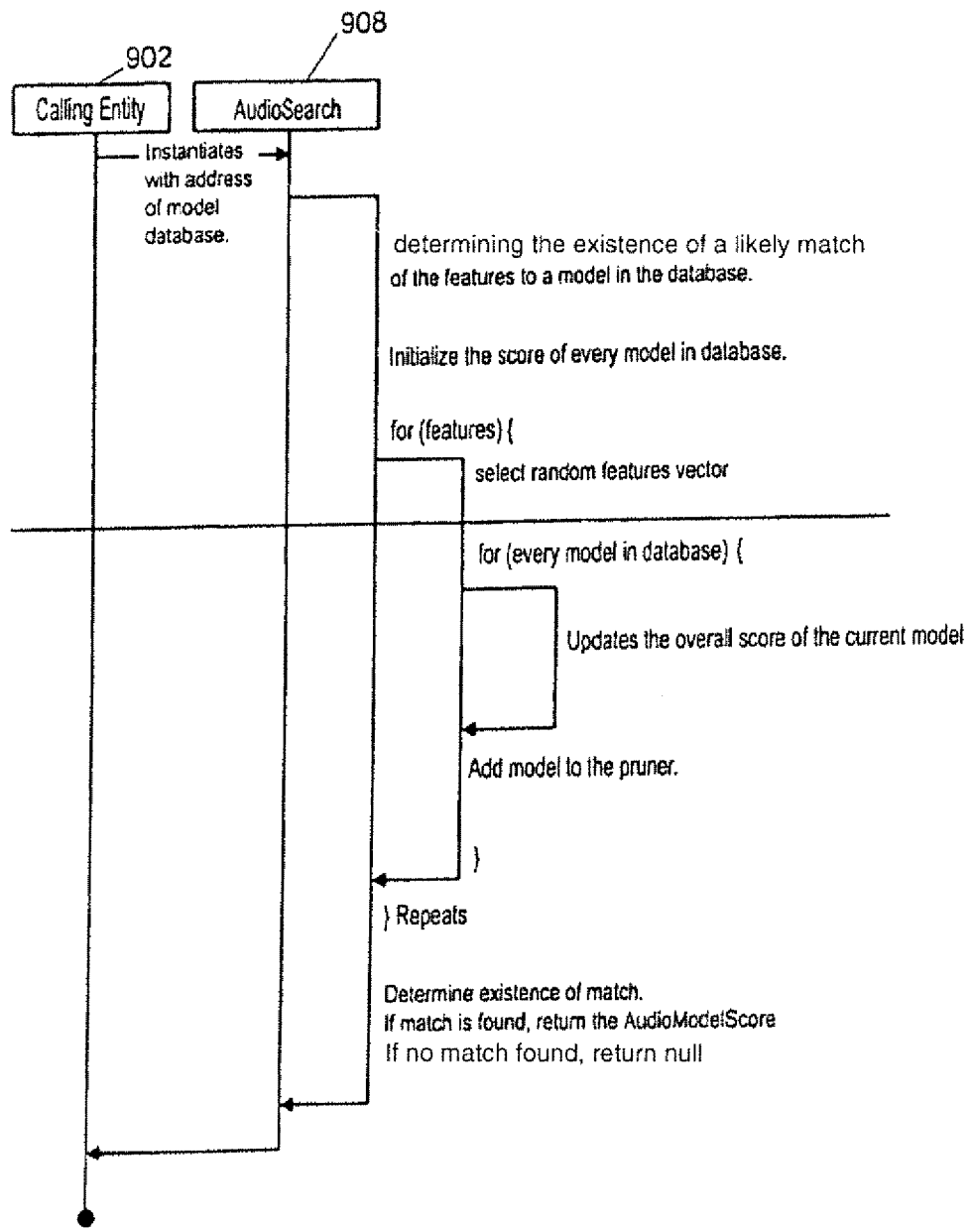
FIG. 15 is an annotated sequence diagram for identifying a digital audio work according to a Stochastic Audio Matching Mechanism.

FIG. 15 is an annotated sequence diagram describing the process of media identification within SAMM. The implementation of the 3. Media Identification process is similar to 1. Feature and 2. Media Model Generation. A calling entity 902 initiates the identification process via the use of the AudioSearch object 908. The inputs required for the AudioSearch object 902 are an AudioAnalyzer object 904, which contains the set of features to be searched, and a reference to the in-memory database used to store all the known models against which SAMM is comparing the unknown audio input.

Accordingly, novel systems and methods for protecting digital works have been disclosed. While embodiments and applications of the invention have been shown and described, it would be apparent to those skilled in the art that many more modifications are possible without departing from the inventive concepts herein. The invention, therefore, is not to be restricted except in the spirit of the appended claims.

The invention claimed is:

1. A method for altering the behavior of a network device of a copyright protection computer system based on transmissions of digital works comprising:

maintaining a registry of information permitting identification of digital works in a database hosted by a computer system, the registry information comprising data for a hierarchy of assessment criteria ordered based on consumption of a processing resource, the hierarchy of assessment criteria comprising at least two of a file name, a file size, a source address, a metadata identifier, and a watermark;

monitoring a network for transmission of at least one packet-based digital signal associated with a digital work, the digital work including at least one of audio content and video content;

determining whether the digital work is a registered digital work by comparing a feature, which corresponds to the first assessment criterion and is extracted from the at least one digital signal, to the registry information corresponding to the first assessment criterion;

in response to a determination using the first assessment criterion that the digital work is not a registered digital work, repeating a use of a next assessment criterion to determine whether the digital work is a registered digital work until one of the hierarchy of assessment criteria results in the digital work being a registered digital work or none of the hierarchy of assessment criteria results in the digital work being a registered digital work;

in response to a determination that none of the hierarchy of assessment criteria results in the digital work being a registered digital work, generating a fingerprint for the at least one digital signal, utilizing the fingerprint to assess whether the digital work associated with the at least one digital signal is a registered digital work, and altering a functional behavior of the network device with respect to a transmission of the digital work associated with the at least one digital signal; and in response to a determination that one of the hierarchy of assessment criteria results in the digital work being a registered digital work, altering, by the copyright protection computer system, the functional behavior of the network device with respect to the transmission of the digital work associated with the at least one digital signal based on the comparison of the digital work associated with the at least one digital signal with the registry information.

2. The method of claim 1, wherein the network device is a network appliance operable to analyze content of digital works.

3. The method of claim 1, wherein the altering comprises:
upon determining that the digital work associated with the at least one digital signal is a registered digital work, triggering the network device to cause at least one of:
blocking or interrupting the transmission without notifying an intended recipient of the transmission that the transmission includes a registered digital work,
sending a message to at least one of a source address of the transmission and a recipient address of the transmission to provide additional information pertaining to the digital work or the transmission of the digital work,
redirecting a future communication from the recipient address to a web site,
recording the transmission,
reporting the transmission, and
forwarding an advertisement to the recipient address.

4. The method of claim 3, wherein interrupting the transmission comprises inserting different content into the transmission.

5. The method of claim 3, wherein the message sent to at least one of the source address and the recipient address identifies a website with the additional information pertaining to the digital work or the transmission of the digital work.

6. The method of claim 3, wherein the message is sent to at least one of the source address and the recipient address via an instant messaging protocol.

7. The method of claim 3, wherein sending the message to at least one of the source address and the recipient address comprises:
detecting an active client application on a computing device intended to receive the transmission, the client application having communication capability; and
transmitting the message to the client application.

8. The method of claim 7, wherein the client application is a web browser and the message is an HTTP message or an HTTPS message.

9. A computer readable storage medium having instructions stored thereon that when executed by a computer cause the computer to perform a method for altering the behavior of a network device of a copyright protection computer system based on transmissions of digital works, the method comprising:
maintaining a registry of information permitting identification of digital works in a database hosted by a computer system, the registry information comprising data for a hierarchy of assessment criteria ordered based on consumption of a processing resource, the hierarchy of assessment criteria comprising at least two of a file name, a file size, a source address, a metadata identifier, and a watermark;

monitoring a network for transmission of at least one packet-based digital signal associated with a digital work, the digital work including at least one of audio content and video content;

determining whether the digital work is a registered digital work by comparing a feature, which corresponds to the first assessment criterion and is extracted from the at least one digital signal, to the registry information corresponding to the first assessment criterion;

in response to a determination using the first assessment criterion that the digital work is not a registered digital work, repeating a use of a next assessment criterion to determine whether the digital work is a registered digital work until one of the hierarchy of assessment criteria results in the digital work being a registered digital work or none of the hierarchy of assessment criteria results in the digital work being a registered digital work;

in response to a determination that none of the hierarchy of assessment criteria results in the digital work being a registered digital work, generating a fingerprint for the at least one digital signal, utilizing the fingerprint to assess whether the digital work associated with the at least one digital signal is a registered digital work, and altering a functional behavior of the network device with respect to a transmission of the digital work associated with the at least one digital signal; and in response to a determination that one of the hierarchy of assessment criteria results in the digital work being a registered digital work, altering, by the copyright protection computer system, the functional behavior of the network device with respect to the transmission of the digital work associated with the at least one digital signal based on the comparison of the digital work associated with the at least one digital signal with the registry information.

10. The computer readable storage medium of claim 9, wherein the network device is a network appliance operable to analyze content of digital works.

11. The computer readable storage medium of claim 9, wherein the altering comprises:
upon determining that the digital work associated with the at least one digital signal is a registered digital work, triggering the network device to cause at least one of:

blocking or interrupting the transmission without notifying an intended recipient of the transmission that the transmission includes a registered digital work, sending a message to at least one of a source address of the transmission and a recipient address of the transmission to provide additional information pertaining to the work or the transmission of the work, redirecting a future communication from the recipient address to a web site, recording the transmission, reporting the transmission, and forwarding an advertisement to the recipient address.

12. The computer readable storage medium of claim 11, wherein interrupting the transmission comprises inserting different content into the transmission.

13. The computer readable storage medium of claim 11, wherein the message sent to at least one of the source address and the recipient address identifies a website with the additional information pertaining to the digital work or the transmission of the work.

14. The computer readable storage medium of claim 11, wherein the message is sent to at least one of the source address and the recipient address via an instant messaging protocol.

15. The computer readable storage medium of claim 11, wherein sending the message to at least one of the source address and the recipient address comprises:

detecting an active client application on a computing device intended to receive the transmission, the client application having communication capability; and transmitting the message to the client application, wherein the client application is a web browser and the message is an HTTP message or an HTTPS message.

16. A computer system for altering the behavior of a network device based on transmissions of digital works, the computer system comprising:

a memory to store a registry of information permitting identification of digital works, the registry information comprising data for a hierarchy of assessment criteria ordered based on consumption of a processing resource, the hierarchy of assessment criteria comprising at least two of a file name, a file size, a source address, a metadata identifier, and a watermark; and at least one processor, coupled to the memory, to monitor a network for transmission of at least one packet-based digital signal associated with a digital work, the digital work including at least one of audio content and video content, determine whether the digital work is a registered digital work by comparing a feature, which corresponds to the first assessment criterion and is extracted from the at least one digital signal, to the registry information corresponding to the first assessment criterion, in response to a determination using the first assessment criterion that the digital work is not a registered digital work, repeating a use of a next assessment criterion to determine whether the digital work is a registered digital work until one of the hierarchy of assessment criteria results in the digital work being a registered digital work or none of the hierarchy of assessment criteria results in the digital work being a registered digital work, in response to a determination that none of the hierarchy of assessment criteria results in the digital work being a registered digital work, generating a fingerprint for the at least one digital signal, utilizing the fingerprint to assess whether the digital work associated with the at least one digital signal is a registered digital work, and altering a functional behavior of the network device with respect to a transmission of the digital work associated with the at least one digital signal, and in response to a determination that one of the hierarchy of assessment criteria results in the digital work being a registered digital work, alter the functional behavior of the network device with respect to the transmission of the digital work associated with the at least one digital signal based on the comparison of the digital work associated with the at least one digital signal with the registry information.

17. The computer system of claim 16, wherein the network device is a network appliance operable to analyze content of digital works.

18. The computer system of claim 16, wherein the processor is to alter the functional behavior by determining that the digital work associated with the at least one digital signal is a registered digital work, and to trigger the network device to cause at least one of:

blocking or interrupting the transmission without notifying an intended recipient of the transmission that the transmission includes a registered digital work, wherein interrupting the transmission comprises inserting different content into the transmission sending a message to at least one of a source address of the transmission and a recipient address of the transmission to provide additional information pertaining to the work or the transmission of the work; or redirecting a future communication from the recipient address to a web site.

19. The computer system of claim 16, wherein the message is sent to at least one of the source address and the recipient address via an instant messaging protocol.

20. The computer system of claim 16, wherein sending the message to at least one of the source address and the recipient address comprises:

detecting an active client application on a computing device intended to receive the transmission, the client application having communication capability; and transmitting the message to the client application, wherein the client application is a web browser and the message is an HTTP message or an HTTPS message.

* * * * *